US006856706B2

(12) United States Patent
Yamada

(10) Patent No.: US 6,856,706 B2
(45) Date of Patent: Feb. 15, 2005

(54) IMAGE PROCESSING METHOD AND SYSTEM, AND STORAGE MEDIUM

(75) Inventor: Masahiko Yamada, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 713 days.

(21) Appl. No.: 09/778,910

(22) Filed: Feb. 8, 2001

(65) Prior Publication Data

US 2001/0026643 A1 Oct. 4, 2001

(30) Foreign Application Priority Data

Feb. 8, 2000 (JP) ........................................ 2000-030297

(51) Int. Cl.$^7$ ................................................ G06K 9/36
(52) U.S. Cl. .................... 382/276; 382/278; 382/298; 382/299; 258/1.2; 258/3.21
(58) Field of Search ................................ 382/239, 240, 382/277, 278, 298, 299, 305, 209, 217, 218, 219; 358/1.2, 3.21, 3.22, 3.24, 3.27, 3.26, 501

(56) References Cited

U.S. PATENT DOCUMENTS

| 4,315,318 | A |   | 2/1982  | Kato et al. ................... 364/515 |
|-----------|---|---|---------|----------------------------------------|
| 4,317,179 | A |   | 2/1982  | Kato et al. ................... 364/515 |
| 5,454,044 | A |   | 9/1995  | Nakajima ..................... 382/132  |
| 5,608,813 | A |   | 3/1997  | Nakajima ..................... 382/132  |
| 5,615,310 | A | * | 3/1997  | Kim ............................ 358/1.2 |
| 5,991,457 | A |   | 11/1999 | Ito et al. ...................... 382/254 |
| 6,072,913 | A |   | 6/2000  | Yamada ....................... 382/275  |
| 6,122,412 | A | * | 9/2000  | Noguchi et al. .............. 382/312   |
| 6,175,352 | B1| * | 1/2001  | Kay et al. .................... 345/100  |
| 6,316,974 | B1| * | 11/2001 | Taraci et al. ................. 327/147  |
| 6,516,089 | B1| * | 2/2003  | McCann et al. .............. 382/166   |
| 6,532,024 | B1| * | 3/2003  | Mauger et al. .............. 345/716   |
| 6,567,116 | B1| * | 5/2003  | Aman et al. ................. 348/169   |

FOREIGN PATENT DOCUMENTS

| JP | 55-87953   | 7/1980  | .......... G01N/33/50 |
| JP | 55-163472  | 12/1980 | .......... G01T/1/29  |
| JP | 3-222577   | 10/1991 | .......... H04N/1/41  |
| JP | 10-75364   | 3/1998  | .......... H04N/1/407 |
| JP | 10-75395   | 3/1998  | .......... H04N/5/325 |
| JP | 10-171983  | 6/1998  | .......... G06T/5/20  |

\* cited by examiner

*Primary Examiner*—Bhavesh M. Mehta
*Assistant Examiner*—Yosef Kassa
(74) *Attorney, Agent, or Firm*—Sughrue Mion, PLLC

(57) ABSTRACT

Output-size information G1 and reference-resolution information G0 are input to a zoom-rate section. The zoom-rate section derives zoom-rates M1 and M2, based on the output-size information G1 and the reference-resolution information G0. A reconstruction section reconstructs an image at the resolution level corresponding to the specified zoom-rate M1. A parameter-setting section derives an image-processing parameter K1 suitable for the resolution level of a reconstructed-image signal S1, based on the zoom-rate M1, reference-resolution information G0, and reference-processing parameter K0, and sets the derived parameter K1 to the image-processing section. The image-processing section obtains a processed-image signal S2 by performing image processing, using the image-processing parameter K1. A zoom-processing section performs a zoom process on the processed-image signal S2, using the zoom rate M2.

47 Claims, 14 Drawing Sheets

FIG.9

| | | | | | | |
|---|---|---|---|---|---|---|
| REFERENCE RESOLUTION IMAGE | Sorg | Sus 1 | Sus 2 | Sus 3 | Sus 4 | Sus 5 | Sus 6 |
| 1/2 RESOLUTION IMAGE (1/2² REDUCTION IMAGE) | | Sorg | Sus 1 | Sus 2 | Sus 3 | Sus 4 | Sus 5 |
| 1/4 RESOLUTION IMAGE (1/4² REDUCTION IMAGE) | | | Sorg | Sus 1 | Sus 2 | Sus 3 | Sus 4 |
| 1/8 RESOLUTION IMAGE (1/8² REDUCTION IMAGE) | | | | Sorg | Sus 1 | Sus 2 | Sus 3 |
| 1/16 RESOLUTION IMAGE (1/16² REDUCTION IMAGE) | | | | | Sorg | Sus 1 | Sus 2 |

FIG. 10

| | | | | | | |
|---|---|---|---|---|---|---|
| REFERENCE RESOLUTION IMAGE | Sorg-Sus1 | Sus1-Sus2 | Sus2-Sus3 | Sus3-Sus4 | Sus4-Sus5 | Sus5-Sus6 |
| 1/2 RESOLUTION IMAGE (1/2² REDUCTION IMAGE) | | Sorg-Sus1 | Sus1-Sus2 | Sus2-Sus3 | Sus3-Sus4 | Sus4-Sus5 |
| 1/4 RESOLUTION IMAGE (1/4² REDUCTION IMAGE) | | | Sorg-Sus1 | Sus1-Sus2 | Sus2-Sus3 | Sus3-Sus4 |
| 1/8 RESOLUTION IMAGE (1/8² REDUCTION IMAGE) | | | | Sorg-Sus1 | Sus1-Sus2 | Sus2-Sus3 |
| 1/16 RESOLUTION IMAGE (1/16² REDUCTION IMAGE) | | | | | Sorg-Sus1 | Sus1-Sus2 |

FIG. 11

| | | | | | | |
|---|---|---|---|---|---|---|
| REFERENCE RESOLUTION IMAGE | f1 | f2 | f3 | f4 | f5 | f6 |
| 1/2 RESOLUTION IMAGE<br>($1/2^2$ REDUCTION IMAGE) | | f2 | f3 | f4 | f5 | f6 |
| 1/4 RESOLUTION IMAGE:<br>($1/4^2$ REDUCTION IMAGE) | | | f3 | f4 | f5 | f6 |
| 1/8 RESOLUTION IMAGE:<br>($1/8^2$ REDUCTION IMAGE) | | | | f4 | f5 | f6 |
| 1/16 RESOLUTION IMAGE<br>($1/16^2$ REDUCTION IMAGE) | | | | | f5 | f6 |

IMAGE PROCESSING METHOD AND SYSTEM, AND STORAGE MEDIUM

BACKGROUND OF THE INVENTION

1. Field of the Invention

The present invention relates to an image-processing method and system for reconstructing an image having a predetermined resolution, based on a stored image signal that has been subjected to a multiple-resolution transformation process, and performing a predetermined image-processing process on the reconstructed image, and relates to a computer readable storage medium recording a program which makes a computer execute the image-processing method.

2. Description of the Related Art

There have recently been proposed methods of performing a multiple-resolution transformation process on an image signal which represents an image acquired by an image reader, a digital still camera, etc., in order to obtain hierarchical data for each resolution level, which represents an image whose resolution becomes $\frac{1}{2}^P$ times that of the resolution of the acquired image and whose size becomes $\frac{1}{2}^{2P}$ times that of the acquired image. Each hierarchical data obtained is encoded, compressed and stored. It is also known that such multiple-resolution transformation processes utilize, for example, the wavelet-transformation utilized in JPEG 2000, the Laplacian pyramid-transformation utilized in the Flash Pix file (proposed by Eastman Kodak), or the Gaussian pyramid-transformation.

On the other hand, for cases in which an image based on an image signal that has been subjected to the multiple-resolution transformation process and stored, is output as a visible image to a CRT monitor, film, etc., the image is reconstructed and used at the same resolution level or image-size as the acquired image, or at an intermediate resolution level or different image-size (enlarged or reduced) than that of the acquired image, depending on the intended application of the image. Because of this, data transfer or image processing can be performed at the resolution level or image-size required for actual reproduction and output. Particularly, for cases in which the aforementioned image processing, etc., are performed on an acquired image whose image-size has been reduced to a smaller size and a lower resolution level, the operating speed and efficiency of the entire system are improved. For instance, for cases in which there is a need to reproduce a high-quality image, as in the case of printers, a high-quality image having the same resolution and image-size as the acquired image can be reproduced by reconstructing images, based on the hierarchical data of all levels which represent the images up to the maximum resolution. When reproducing an image whose resolution is not as high as that of an image output by a printer, as in the case of CRT monitors, an image with a lower resolution and a smaller image-size than that of the acquired image can be reproduced based on the hierarchical data representing the reduction image. Further, an image with a lower resolution and a smaller size than the acquired image but suitable for reproduction at the resolution and screen size of a CRT monitor can be reproduced by enlargement or reduction as necessary.

For cases in which, based on an image signal that has been subjected to the multiple-resolution transformation process and stored, an image with a different resolution level from the reference-resolution (normally, the reference-resolution is the resolution of the acquired image) is reconstructed, and a predetermined image-processing process is to be performed on the thus reconstructed image, the image signal representing the reconstructed image is input to an image-processing circuit and the image-processing is performed based on use of the image-processing parameter set in correlation with the aforementioned reference-resolution image (acquired image) having the aforementioned reference-resolution.

However, there are cases in which the set image-processing parameter is not always suitable for the reconstructed image. For instance, for cases in which the image-processing circuit performs a process of spatially correcting an image, such as a frequency enhancement process, a smoothing process, etc., the size of the processed image relative to the actual image varies depending upon image resolution. That is, the mask-size, for example, is dependent on image resolution. Because of this, if the aforementioned image-processing is performed on a reconstructed image based on use of a mask size (9×9 pixels)set for the reference-resolution image, an image component not included in processing the reference-resolution image will be contained within the mask when the reconstructed image is lower in resolution than the reference-resolution image, and an image component included in processing the reference-resolution image will not be contained within the mask when the reconstructed image is higher in resolution than the reference-resolution image. Consequently, that portion of the reconstructed image not equivalent spatially will be enhanced or smoothed, giving rise to the problem wherein the image characteristics of the reconstructed image subjected to the predetermined image-processing process are not the same as those of the reference-resolution image subjected to the predetermined image-processing. If the difference in resolution between the reference-resolution image and the reconstructed image becomes greater, this problem also becomes greater.

One method considered for solving the above problem is to archive an image-processing parameter corresponding to each resolution level in correlation with the archived image when encoding, compressing, and storing each hierarchical data (hereinafter also referred to as image-archiving time), for example. If an image-processing parameter corresponding to each resolution level is to be stored, however, the number of image-processing parameters will be enormous, and management of the image-processing parameters becomes extremely cumbersome. In addition, because image-processing parameters corresponding to all resolution levels must be calculated and stored at a stage wherein a determination as to whether or not they are actually to be utilized has not been made the aforementioned method is inefficient.

SUMMARY OF THE INVENTION

The present invention has been made in view of the aforementioned problems found in the prior art.

Accordingly, the first major object of the present invention is to provide an image-processing method and an image-processing system which are capable of reconstructing an image whose resolution differs from a reference-resolution and whose image-size differs from the image-size of a reference-resolution image, based on an image signal that has been subjected to a multiple-resolution transformation process, and causing the image characteristics of the reconstructed image subjected to a predetermined image-processing process the same as the image characteristics of the reference-resolution image subjected to the predetermined image-processing process, without the necessity of preparing an image-processing parameter for each resolution level when performing the predetermined image-processing on the reconstructed image.

A second major object of the invention is to provide a computer readable storage medium recording a program that causes a computer to execute the image-processing method.

To achieve the aforementioned objects of the present invention and in accordance with an important aspect of the present invention, there is provided an image-processing method comprising the steps of:

reconstructing an image whose resolution differs from a reference-resolution, based on an image signal subjected to a multiple-resolution transformation process; and deriving an image-processing parameter, based on a reference-processing parameter employed in performing a predetermined image-processing process on a reference-resolution image having the reference-resolution, the image-processing parameter being employed in performing the predetermined image-processing process on the reconstructed image and causing the image characteristics of the reconstructed image subjected to the predetermined image-processing process to be substantially the same as the image characteristics of the reference-resolution image subjected to the predetermined image-processing process.

Preferably, the image signal subjected to multiple-resolution transformation process is encoded, compressed, and stored in a predetermined storage medium.

The predetermined image-processing process may be, for example, a frequency-enhancement process of enhancing a specific frequency component contained in the original image signal by use of a non-sharpness mask image signal (hereinafter referred to as blurred-image signal), a dynamic-range compression process of reducing a contrast value (image signal value) in either a high-density area or a low-density area, or contrast values in both, by the use of the blurred-image signal so that the difference between the maximum density and minimum density of the original image, i.e., the dynamic range, is narrowed, and other processes proposed as methods for improving the diagnostic efficiency of a radiation image by the applicant of this application (see Japanese Unexamined Patent Publication Nos. 55(1980)-163472, 55(1980)-87953, 3(1991)-222577, 10(1998)-75364, 10(1998)-75395, 10(1998)-171983, etc.).

The word "image-size" is used herein to mean the total number of pixels in an image (or an image signal). The word "resolution" generally has a very broad meaning. There are cases in which, for example, it is used to mean sharpness, and other cases in which it is used to mean the pixel density of an image (or an image signal). However, use of the word "resolution" herein is related to the degree of sharpness of an image, including an increase or decrease in sharpness, for example, caused by an increase or decrease in pixel density (in this case, image-size is also increased or decreased), an increase or decrease in sharpness caused by enlargement or reduction of a range of frequencies that are (can be) reproduced, or an increase or decrease in sharpness caused by changing the signal response, while maintaining the same pixel density. Therefore, for instance, when a reference-resolution image is converted to a low-resolution image by a filtering process that employs a pixel-thinning process, etc., the pixel density is reduced and the low-resolution image becomes smaller in image-size than the reference-resolution image. On the other hand, for a blurred image with low sharpness, obtained by interpolating and enlarging the low-resolution image obtained by the aforementioned pixel-thinning filtering process, the pixel density is the same as that of the reference-resolution image, and the image-size is also the same. In other words, the low-resolution image, obtained by the aforementioned pixel-thinning filtering process, is an image which is lower in resolution and smaller in image-size than the reference-resolution image, while the blurred image is an image which is lower in resolution than the reference-resolution image and the same in image-size as the reference-resolution image.

In a preferred form of the image-processing method of the present invention, the aforementioned image signal is subjected to the multiple-resolution transformation process so that the resolution of each image is $2^k$ (where k is an integer) times that of the reference-resolution, and the image-size of each image is $2^{2k}$ times the image-size of the reference-resolution image, and the reconstructed image is an image having a resolution not falling within the range of $2^k$ times the reference-resolution.

The expression "resolution is $2^k$ times" means that the pixel densities in the horizontal and vertical-scanning directions are $2^k$ times, respectively. The expression "image-size is $2^{2k}$ times" means, that by increasing pixel density in the horizontal and vertical-scanning directions by $2^k$ times, the image-size (total number of pixels) is increased by $2^{2k}$ times. The letter "k" in "$2^k$ times or $2^{2k}$ times" is an integer, which can be zero, a positive integer, or a negative integer. Therefore, the words "$2^{2k}$ times" include cases in which the image-size of the reference-resolution image remains unchanged (k=0), as well as cases in which it is enlarged (k>0), or reduced (k<0).

In the image-processing method of the present invention, the reconstructed image subjected to the predetermined image-processing process may further be converted to an image having a desired image-size.

In the image-processing method of the present invention, the aforementioned reconstructing is performed so that the image-size of the reconstructed image is $2^{2k}$ times the image-size of the reference-resolution image, which is close to the image-size of an image reproduced and output as a visible image. Thereafter, an image subjected to the predetermined image-processing process can be further subjected to a zoom process that causes the image-size to be enlarged (k>0), reduced (k<0), or maintained (k=0) so that it becomes equal to the image-size of the output image. For example, when the image-size of an output image is $2^{2k}$ times the image-size of the reference-resolution image, the image-size of an image represented by the processed-image signal obtained by performing the aforementioned predetermined image-processing process, becomes the same as that of the output image. Therefore, when performing a zoom process so that the image subjected to the predetermined image-processing process "becomes equal to the image-size of the output image," the zoom-rate can be set to 1, because in practice, the processed-image signal, as it is, may be employed as an image signal subjected to the zoom process (i.e. in practice, there is no need to perform the zoom process).

In another preferred form of the image-processing method of the present invention, the reference-processing parameter is stored in correlation with the image signal.

In still another preferred form of the image-processing method of the present invention, the image-processing parameter is calculated based on the characteristic of the multiple-resolution transformation process.

The expression "the characteristic of the multiple-resolution transformation process" refers to the characteristic effect a particular multiple-resolution transformation process has on the image response at each resolution level. When a wavelet-transformation process is utilized, for example, the aforementioned characteristic refers to the characteristics of the low-pass filter and high-pass filter employed in wavelet-splitting (band-splitting).

In accordance with another important aspect of the present invention, there is provided an image-processing system comprising:

reconstruction means for reconstructing an image which has a resolution differing from a reference-resolution, based on an image signal subjected to multiple-resolution transformation process;

image-processing means for performing a predetermined image-processing process on the reconstructed image; and parameter-setting means for deriving an image-processing parameter, based on a reference-processing parameter employed in performing the predetermined image-process on a reference-resolution image having the reference-resolution, and setting the derived image-processing parameter to the image-processing means, wherein the image-processing parameter is employed in performing the predetermined image-processing process on the reconstructed image and causes the image characteristics of the reconstructed image subjected to the predetermined image-processing process to be substantially the same as the image characteristics of the reference-resolution image subjected to the predetermined image-processing.

In a preferred form of the image-processing system of the present invention, the image signal is subjected to the multiple-resolution transformation process so that the resolution of each image is $2^k$ (where k is an integer) times the reference-resolution and the image-size of each image is $2^{2k}$ times the image-size of the reference-resolution image, and the reconstruction means obtains a reconstructed image having a resolution which does not fall within the range of $2^k$ times resolution the reference-resolution.

In another preferred form of the image-processing system of the present invention, the system further comprises zoom-processing means for further converting the reconstructed image subjected to the predetermined image processing, to an image having a desired image-size.

In still another preferred form of the image-processing system of the present invention, the reconstruction means reconstructs an image so that the image-size of the image is $2^{2k}$ times the image-size of the reference-resolution image, close to the image-size of an image which is reproduced and output as a visible image, and zoom-processing means is further provided for performing a zoom process on an image, subjected to the predetermined image-processing, so that it becomes equal to the image-size of the output image.

In a further preferred form of the image-processing system of the present invention, the parameter-setting means derives the image-processing parameter, based on the characteristic of the multiple-resolution transformation process.

In accordance with still another important aspect of the present invention, there is provided a computer-readable storage medium recording a program which causes a computer to execute the image-processing method of the present invention.

According to the present invention, an image that has a resolution differing from a reference-resolution is constructed, and an image-processing parameter is derived based on a reference-processing parameter for a reference-resolution image. The image-processing parameter is employed in performing a predetermined image-processing process on the reconstructed image, and causes the image characteristics of the reconstructed image subjected to the predetermined image-processing process to be substantially the same as the characteristics of the reference-resolution image subjected to the predetermined image-processing process. Therefore, when an image signal subjected to a multiple-resolution transformation process is reconstructed at a resolution differing from the reference-resolution, and the reconstructed image is subjected to a predetermined image-processing process, the image characteristics of the image subjected to the image-processing process can be caused to be substantially the same as that of the reference-resolution image subjected to the predetermined image-processing process, without concern as to the resolution of the reconstructed image. In other words, output images can be made uniform in image characteristics regardless of the resolution level of the reconstructed image.

The image-processing parameter for a reconstructed image is derived based on the reference-processing parameter of the reference-resolution image. Therefore, the necessity for preparing an image-processing parameter for each resolution level of a reconstructed image (reconstructed-resolution level) is eliminated. This makes the construction of a system employing the present invention simpler and eliminates the cumbersomeness involved in managing image-processing parameters.

For cases in which the image signal is subjected to the multiple-resolution transformation process so that the resolution of each image is $2^k$ (where k is an integer) times the reference-resolution and the image-size of each image is $2^{2k}$ times the image-size of the reference-resolution image, a known multiple-resolution transformation process such as wavelet transformation, etc., can be utilized if reconstruction is performed so that the reconstructed image is an image having a resolution not falling within the $2^k$ times resolution of the reference-resolution. Thus, the image-processing method according to the present invention is a convenient method.

When the image-size of a reconstructed image becomes $2^{2k}$ times (where k is a negative integer) the reference-resolution image, the reconstructed image becomes a reduction image, having a smaller number of pixels than the reference-resolution image. Because a predetermined image-processing process such as an enhancement process, etc., can be performed on this reduction image, the calculation time for performing the predetermined image-processing process can be reduced.

If a zoom process is further performed on the image subjected to the predetermined image-processing, the size of an image to be finally output can be made coincident with a desired output-size.

If the image-processing parameter is stored in correlation with the image signal subjected to the multiple-resolution transformation process, the cumbersomeness involved in managing image-processing parameters can be eliminated.

Furthermore, if the image-processing parameter is derived based on the characteristic of the multiple-resolution transformation process, the image characteristics of an image subjected to a predetermined image-processing process can be caused to be substantially the same as that of the reference-resolution image subjected to the predetermined image-processing, without being affected by the characteristic of the multiple-resolution transformation process.

BRIEF DESCRIPTION OF THE DRAWINGS

The present invention will be described in further detail with reference to the accompanying drawings wherein:

FIG. 9 is a diagram showing the corresponding relationship between the 6 blurred-image signals obtained of the reference-resolution image, and the blurred-image signals obtained of the low-resolution images ranging from the minimum resolution to a frequency band nearest a predetermined resolution;

FIG. 10 is a diagram showing the corresponding relationship between (1) the 6 (six) blurred-image signals obtained of the reference-resolution image, and (2) the original image signals based on images of each resolution level and the low-resolution band-limited image signals obtained from blurred-image signals;

FIG. 11 is a diagram showing the corresponding relationship between the transformation functions of the reference-resolution image, and the corresponding relationship between the transformation functions of each of the ½ to ¹⁄₁₆ resolution images;

DESCRIPTION OF THE PREFERRED EMBODIMENTS

Figure 1:
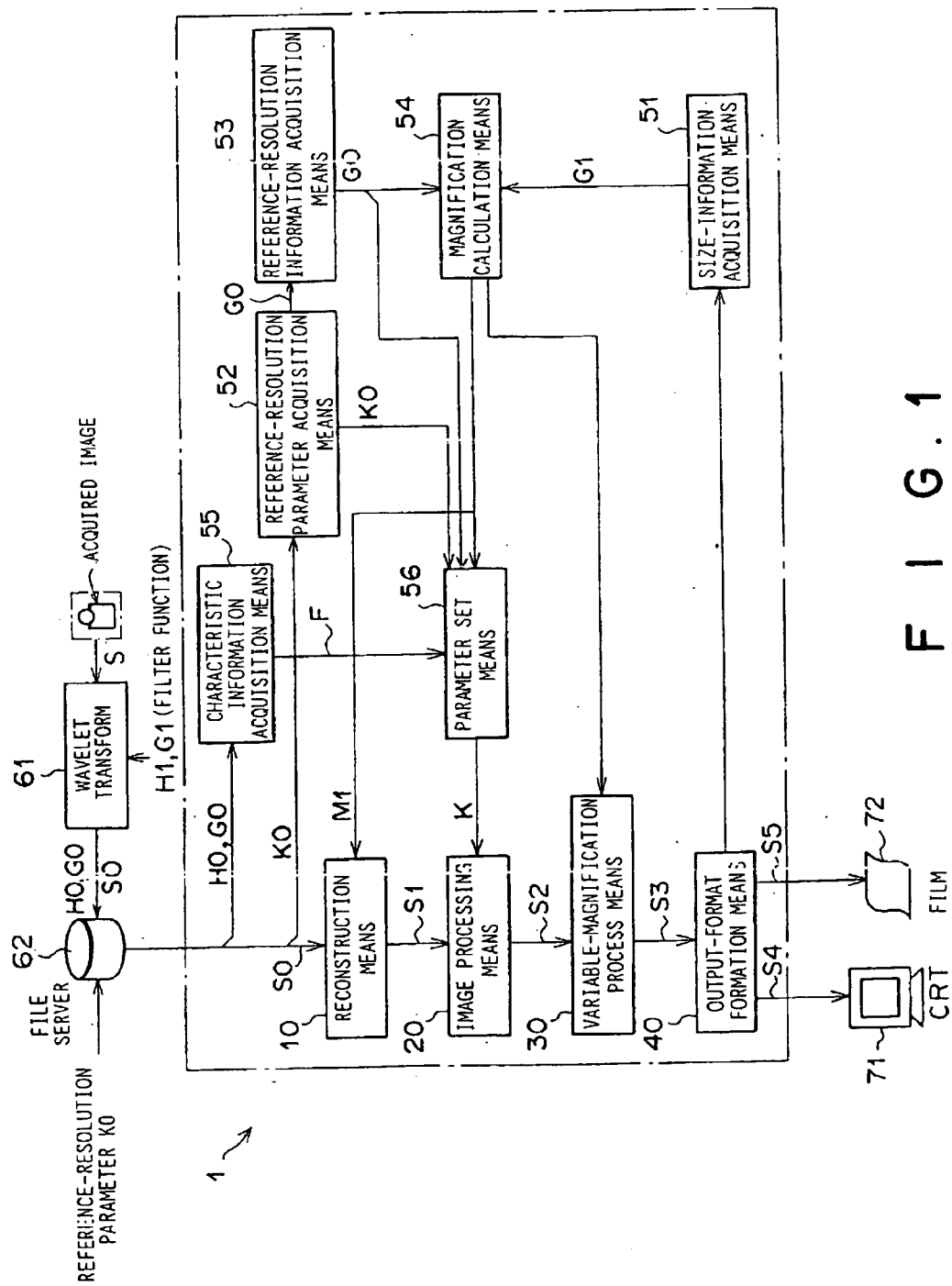
FIG. 1 is a block diagram showing an image-processing system constructed according to an embodiment of the present invention.

Referring now in greater detail to the drawings and initially to FIG. 1, there is shown an image-processing system in accordance with a preferred embodiment of the present invention. The image-processing system 1 in the preferred embodiment reconstructs an image close to a desired resolution or image-size, based on an image signal subjected to a multiple-resolution transformation process and stored in a file server 62. The image-processing system 1 also performs a predetermined image-processing process on the reconstructed image so that an output image that is reproduced as a visible image on a CRT monitor or film becomes an image suitable for diagnosis.

Note that an image signal S0 stored in the file server 62 represents an image acquired by reading radiation-image information with an image reader (not shown), etc. such an image subjected to image-processing by the image-processing system 1 is reproduced and output in a desired layout (a desired output size, disposition, etc.) on a CRT monitor 71, or is recorded on film by the film output unit 72. The thus reproduced or recorded image is employed for diagnosis.

The image-processing system 1 has (1) reconstruction means 10 for obtaining a reconstructed-image signal S1 by reconstructing an image having a predetermined resolution level, based on a signal S0, which has been subjected to a multiple-resolution transformation process, and read out from the file server 62; (2) image-processing means 20 for obtaining a first processed-image signal S2 by performing a predetermined image-processing process on the reconstructed-image signal S1 reconstructed with the reconstruction means 10, by the use of a set image-processing parameter K (K0 or K1); (3) a zoom-processing means 30 for obtaining a second processed-image signal S3 by performing an enlargement or reduction process (hereinafter together referred to as a zoom process) so that the size of the image represented by the first processed-image signal S2 coincides with a desired output size; and (4) output-format setting means 40 for setting a desired output-format by use of the second processed-image signal S3 subjected to the zoom process, so that an image is reproduced and output according to the desired output-format.

The image-processing system 1 also has (1) size-information acquisition means 51 for acquiring information G1 on the size (output-size) of a reproduced image set by the output-format setting means 40; (2) reference-processing parameter acquisition means 52 for acquiring a reference-processing parameter K0 which is employed in performing the predetermined image-processing process on a reference-resolution image; (3) reference-resolution information acquisition means 53 for acquiring information G0 on the reference-resolution; (4) zoom-rate calculation means 54 for deriving a first zoom-rate M1 for specifying the resolution level (reconstructed resolution) of the image reconstructed by the reconstruction means 10 and a second zoom rate M2 for specifying a zoom rate in the zoom process employed in the zoom-processing means 30, based on the reference-resolution information G0 and the output-size information G1; and (5) conversion-characteristic information acquisition means 55 for acquiring information F on as to the characteristic of the multiple-resolution transformation process, such as the filter characteristics H0, G0, etc. employed in performing the multiple-resolution transformation process. The image-processing system 1 further comprises a parameter-setting means 56. Based on the reference-processing parameter K0, reference-resolution information G0, first zoom-rate M1, and conversion-characteristic information F, the parameter-setting means 56 derives the reference-processing parameter K0 for cases in which the output size is to be the same as the image-size of the reference-resolution image, and derives an image-processing parameter K1 by correcting the reference-processing parameter K0 so that the parameter K1 is suitable for the resolution reconstructed by the reconstruction means 10, for cases in which the output-size is not to be the same as the image-size of the reference-resolution image. The parameter-setting means 56 also sets the thus derived parameter K0 or K1 to the image-processing means 20.

For acquisition of the reference-resolution information G0 by the reference-resolution information acquisition means 53, the user may input a numerical value by using a keyboard, or select one of the numerals, displayed on the control screen, which represent resolution values. Alternatively, the reference-resolution information G0 may instead be attached to the coded-signal S0 as accessory information, and the reference-resolution information G0 attached to the input coded-signal S0 can thereby be made available to be recognized by an image reader, etc. Any method may be adopted, as long as the reference-resolution information acquisition means 53 acquires the reference-resolution information G0.

Similarly, for the acquisition of the reference-processing parameter K0 by the reference-processing parameter acquisition means 52, and the acquisition of the conversion-characteristic information F by the conversion-characteristic information acquisition means 55, a method similar to the aforementioned acquisition method of the reference-resolution information G0 by the reference-resolution information acquisition means 53 can be employed. Assume that in the following description, the reference-processing parameter K0 and the conversion-characteristic information F are both acquired from the accessory information attached to the image signal S0.

First, a description will be given of the image signal (coded signal) S0, subjected to the multiple-resolution transformation process, which is input to the image-processing system 1. Note that the multiple-resolution transformation process in the preferred embodiment employs the wavelet-transformation method utilized, for example, in JPEG 2000. Illustrated in FIG. 2 are image signals split by the wavelet-transformation method.

The image signal S, acquired by the image reader (not shown), etc., is transformed into a multiple-resolution space and encoded in the following manner by the wavelet-transformation processing means 61. At the first stage of the wavelet-transformation process, the acquired image signal S (equivalent to a signal LL0) is subjected to a filtering process in the horizontal-scanning direction by wavelet functions H1 and G1 so that the pixels in the horizontal-scanning direction are thinned out so as to be spaced at intervals of 1 pixel. As a result, two pixel-thinned image signals are obtained in which the pixel density and total number of pixels (hereinafter referred to simply as the number of pixels) in the horizontal-scanning direction are reduced by ½. Here, the wavelet functions H1 and G1 are a high-pass filter and a low-pass filter, respectively. Each of the two pixel-thinned image signals obtained by the wavelet functions H1 and G1 are subjected to the filtering process in the vertical-scanning direction by the wavelet functions H1 and G1, whereby the number of pixels of each signal in the vertical-scanning direction is reduced by ½. As a result, wavelet transformation coefficient signals (hereinafter also referred to simply as signals) HH1, HL1, LH1, and LL1 are obtained.

Figure 2:
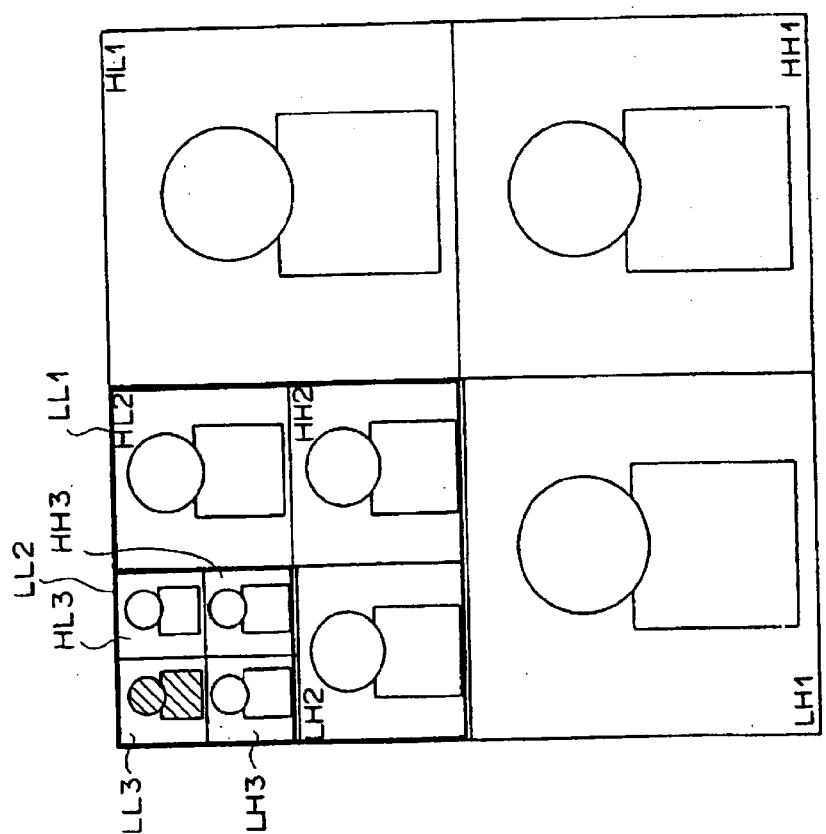
FIG. 2 is a conceptual diagram showing image signals split by a wavelet transformation.

As illustrated in FIG. 2, each signal represents a one-fourth reduction image, reduced by ½ in the horizontal and vertical directions of the acquired image. In the four one-fourth reduction images of the acquired image, the signal LH1 denotes an image representing a vertical high-frequency component, the signal HL1 an image representing a horizontal high-frequency component, the signal HH1 an image representing a diagonal high-frequency component, and the signal LL1 an image of a low-frequency component at ½ resolution.

At the second stage of the wavelet transformation process, the signal LL1 is subjected to wavelet transformation employing the wavelet functions H1 and G1, whereby signals HH2, HL2, LH2, and LL2 are obtained. Each signal represents a one-sixteenth reduction image, reduced by ¼ in the horizontal and vertical directions of the acquired image. In the four one-sixteenth reduction images of the acquired image, the signal LH2 denotes an image representing a vertical high-frequency component, the signal HL2 an image representing a horizontal high-frequency component, the signal HH2 an image representing a diagonal high-frequency component, and the signal LL2 an image of a low-frequency component at ¼ resolution.

In the same way as the second stage, the wavelet-transformation coefficient signal LLk obtained for each frequency band is subjected to wavelet-transformation processing n times, whereby wavelet-transformation coefficient signals HH1 to HHn, HL1 to HLn, LH1 to LHn, and LL1 to LLn are obtained. Note that the letter "k" (=positive integer of 1 to n) in the "signal LLk" is the $k^{th}$ stage of the wavelet-transformation process and indicates the resolution level.

Here, the wavelet-transformation coefficient signals HHn, HLn, LHn, and LLn, obtained by the $n^{th}$ wavelet transformation, represent $(½)^{2n}$ reduction images in which the number of pixels in the horizontal and vertical directions have been reduced by ½, compared with the acquired image signal S. Note that if the letter "n" in the signals HHn, HLn, LHn, and LLn becomes greater, the image-size becomes smaller.

The wavelet-transformation coefficient signals HH1 to HHn, HL1 to HLn, LH1 to LHn, and LL1 to LLn obtained in the aforementioned manner are quantified and encoded, whereby the coded signal S0 is obtained. The filter coefficients of the functions H1 and G1, which represent splitting-filters employed in the wavelet-transformation process, are also encoded, whereby coded functions H0 and G0 are obtained. The coded functions H0 and G0 are attached to the coded signal S0 as accessory information. The coded signal S0 and the coded functions H0, G0 are stored in the file server 62 (refer to FIG. 1).

The coded signal S0 and the coded functions H0 and G0 are subjected to a decoding process followed by an inverse wavelet-transformation process, whereby the acquired original image signal S can be decoded. If the coded signal S0 and the coded functions H0, G0 are decoded up to a desired resolution level j and subjected to inverse wavelet-transformation when reconstructing the image, a low-resolution image signal, which represents an image having the $½^j$ resolution of the acquired image, will be obtained.

Note that if the wavelet transformation coefficient signals LL1 to LLn-1 are provided as hierarchical signals, corresponding to resolution levels, by encoding the signals LL1 to LLn-1 so that they are contained in a coded signal SS, a low-resolution image signal representing an image with $½^j$ the resolution of the acquired image can be obtained by employing only the coded hierarchical signal corresponding to a desired resolution level j. For example, the coded signals of the signals HH2, HL2, LH2, and LL2 are stored for resolution level 2e.

Figure 3:
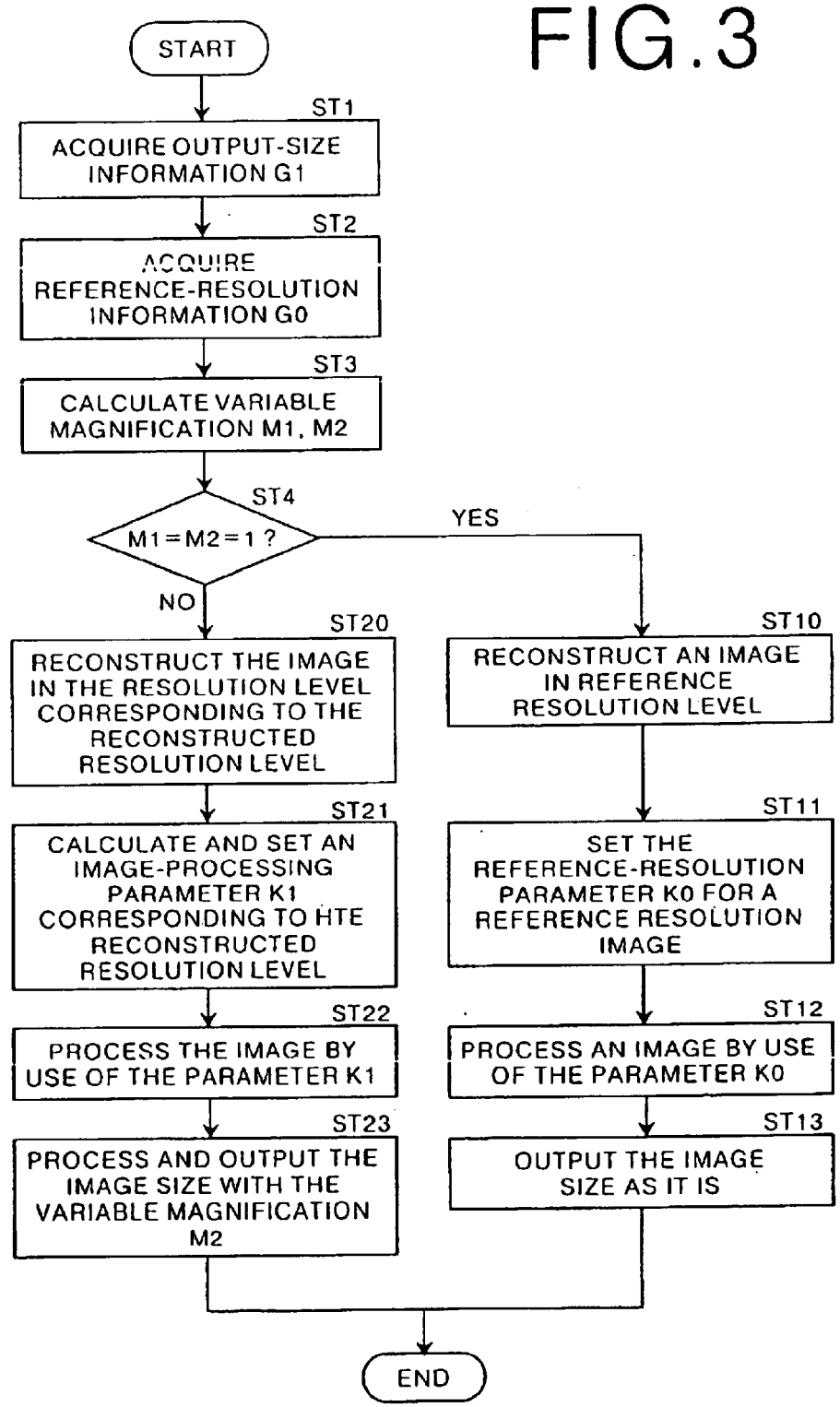
FIG. 3 is a flowchart used to explain the operation of the image-processing system.

Now, the operation of the image-processing system 1 will be described with reference to a flowchart shown in FIG. 3. Note that in the figure, reference character ST denotes a step number. Also, note that in the preferred embodiment, a description will be made with the resolution of the acquired image as the reference-resolution, and the acquired image as a reference-resolution image.

The user inputs a desired output-size to the output-format setting means 40. The output-size set in the output-format setting means 40 (hereinafter referred to as output-size information G1) is acquired by the size-information acquisition means 51, and the acquired output-size information G1 is input to the zoom-rate calculation means 54 (step 1). The reference-resolution information acquisition means 53 acquires the reference-resolution information G0 through the reference-processing parameter acquisition means 52 and inputs the acquired reference-resolution information G0 to the zoom-rate calculation means 54 and the parameter-setting means 56 (step 2). The zoom-rate calculation means 54 calculates a first zoom rate M1 for specifying the image-size of the reconstructed image (reconstructed resolution) and a second zoom rate M2 for specifying a zoom rate with respect to the processed-image signal S2, based on the reference-resolution information G0 and the output-size information G1 (step 3). The zoom-rate calculation means 54 inputs the calculated first zoom rate M1 to the reconstruction means 10 and the parameter-setting means 56 and also inputs the second zoom rate M2 to the zoom-processing means 30.

For example, when the same size as the acquired image (e.g., number of horizontal pixels×number of vertical pixels) is specified as the output-size of an image to be reproduced by the CRT monitor 71, etc., the zoom-rate calculation means 54 sets both the first zoom rate M1 and the second zoom rate M2 to 1.

When the first zoom rate M1 and the second zoom rate M2 are both set to 1 (i.e., if the judgement in step 4 is "YES") the reconstruction means 10 performs a decoding process, based on the coded signal S0 and coded functions H0 and G0 acquired from the file server 62, and then performs an inverse wavelet-transformation process, thereby reconstructing the image in the reference-resolution level (reconstructed resolution). The reconstruction means 10 inputs a reconstructed-image signal representing the reconstructed image to the image-processing means 20 (step 10). The parameter-setting means 56 sets the reference-processing parameter K0 of the reference-resolution image, acquired from the reference-processing parameter acquisition means 52, to the image-processing means 20 (step 11). The image-processing means 20 performs image processing by use of the set reference-processing parameter K0 and inputs the processed-image signal S2 to the zoom-processing means 30 (step 12). The zoom-processing means 30 performs a zoom process on the processed-image signal S2 at a zoom rate of 1 (a zoom rate of 1 is equivalent to no zoom process being performed) and inputs the processed-image signal S3 to the output-format setting means 40 (step 13). In this manner, an image having the same resolution level and the same image-size as that of the reference-resolution image (acquired image) is reproduced by the CRT monitor 71, etc.

Next, a description will be made for cases in which an output image-which has an output-size different from the image-size of the reference-resolution image (acquired image) is to be obtained.

Because the output-size of the image to be obtained differs from the image-size of the reference-resolution image, an image signal representing a $2^{2k}$ reduction image (where k is zero or a negative integer) is utilized as the reconstructed-image signal S1 employed in the image-processing means 20. The $2^{2k}$ reduction image is close to the output-size and is $2^{2k}$ times the image-size of the reference-resolution image. In this case, the judgement in step 4 is "NO." Note that the zoom rate of $2^{2k}$ corresponds to the aforementioned first zoom rate M1.

Here, the first zoom rate M1 of $2^{2k}$ is calculated in the following manner (step 3). If the user enters an output-size different from the image-size of the reference-resolution image to the output-format formation means 40, the size-information acquisition means 51 acquires the output-size information G1 and inputs it to the zoom-rate calculation means 54, as previously indicated.

The zoom-rate calculation means 54 derives the first zoom rate M1 ($2^{2k}$ times), based on the entered output-size information G1 and reference-resolution information G0. For instance, if the entered output-size is $\frac{1}{3}^2$ times, the first zoom rate M1 is set to $\frac{1}{2}^2$ or $\frac{1}{4}^2$ times, which is close to the $\frac{1}{3}^2$ times zoom rate of the entered output-size. Based on the difference between the image-size (i.e., $2^{2k}$ times) of the image reconstructed with the first zoom rate M1 and the entered output-size, the zoom-rate calculation means 54 derives the second zoom rate M2 required for making the image-size output by the zoom-processing means 30 equal to the entered output-size, according to the equation M2=G1/M1.

As described above, the first zoom rate M1 derived by the zoom-rate calculation means 54 is input to the reconstruction means 10. The reconstruction means 10 reconstructs an image having a resolution level corresponding to the first zoom rate M1 (i.e., $2^{2k}$ times). For example, when M1=$2^2$ times, the reconstruction means 10 reconstructs a one-fourth reduction image of ½ resolution and inputs the reconstructed-image signal S1 representing that image to the image-processing means 20 (step 20). The image-processing means 20 performs image processing on an image of the size equal to or slightly different from the image-size of the reference-resolution image (in the preferred embodiment, a reduction image) by use of the image-processing parameter set by the parameter-setting means 56. Here, if a reduction image is subjected to image-processing based on the reference-processing parameter K0 of the reference-resolution image, there will arise a problem in that the image characteristics of the reduction image subjected to the image-processing will not always coincide with those of the reference-resolution image subjected to the image-processing.

To solve the above problem, the parameter-setting means 56 provided in the image-processing system 1 of the preferred embodiment derives an image-processing parameter K1 suitable for the reconstructed resolution, regardless of the resolution level of the image represented by the reconstructed-image signal S1 (i.e., the reconstructed resolution), input to the image-processing means 20. The parameter-setting means 56 sets the derived image-processing parameter K1 to the image-processing means 20. A description will hereinafter be given of how the parameter-setting means 56 derives the image-processing parameter K1 suitable for the reconstructed resolution.

In the parameter-setting means 56, the image-processing parameter K1 suitable for the resolution level of the reconstructed-image signal S1 is derived based on the first variable-zoom rate ratio M1 input by the zoom-rate calculation means 54, the reference-resolution information G0 input from the resolution-information acquisition means 53, and the reference-processing parameter K0 for the reference-resolution image (step 21).

To explain the workings of the processing parameters, descriptions will be made of the parameters of an enhancement filter used for performing a high-frequency enhancement process, or parameters on a smoothing filter used for performing a smoothing process to suppress noise components.

The parameters of the aforementioned filters are mask sizes and filter coefficients. In finding parameters suitable for resolution levels, there is a first method of enlarging or reducing the size of a mask in accordance with a resolution level, i.e., increasing or reducing the number of horizontal pixels×the number of vertical pixels of the mask in accordance with the resolution level, and deriving the filter coefficient for each cell of the enlarged or reduced mask. A second method is to fix the size of a mask without regard to the resolution level, i.e., to fix the number of horizontal pixels×the number of vertical pixels, and to calculate the filter coefficient for each cell of the mask. In calculating the filter coefficient when either method is adopted, the reference-processing parameter K0 for the reference-resolution image is corrected, taking into consideration both the size of the mask region on the actual image and the image component carried by each cell, so that an image obtained by performing the high-frequency enhancement or smoothing process on the reconstructed image has substantially the same image characteristics as an image obtained by performing the high-frequency enhancement or smoothing process on the reference-resolution image.

It is also preferable to take into account the filter characteristic prescribed by the transformation functions employed in the wavelet-transformation process, when making a correction of the reference-processing parameter K0. Therefore, the conversion-characteristic information acquisition means 55 acquires the coded functions H0 and G0 input as accessory information of the image signal S0, and obtains the conversion-characteristic information F of the filter characteristics H0 and G0 by decoding the coded functions H0 and G0, and inputs this information F to the parameter-setting means 56. Based on the conversion-characteristic information F, the parameter-setting means 56 corrects the reference-processing parameter K0 of the reference-resolution image so that an image, obtained by performing the high-frequency enhancement or smoothing process on the reconstructed image, has substantially the same image characteristics as an image obtained by performing the high-frequency enhancement or smoothing process on the reference-resolution image. In this manner, the image characteristic of the reconstructed image subjected to the image processing can be made approximately the same as that of the reference-resolution image subjected to the image-processing, without being affected by the filter characteristic when wavelet splitting is performed.

The parameter-setting means 56 sets the derived image-processing parameter K1 suitable for the reconstructed image to the image-processing means 20 (step 21). The image-processing means 20 performs image-processing such as high-frequency enhancement, smoothing, etc., based on the set image-processing parameter K1, and inputs the obtained processed-image signal S2 to the zoom-processing means 30 (step 22).

The zoom-processing means 30 performs a zoom process (in the preferred embodiment, a reduction process) on the process-image signal S2, based on the second zoom rate M2 input from the zoom-rate calculation means 51. As a result, the processed-image signal S3 representing an image with an image-size which coincides with the output-size G1 set by the output-format setting means 40 is obtained, and input to the output-format setting means 40 (step 23). In this way, an image having a desired image-size G1 and a resolution of $2^k$ is reproduced by the CRT monitor 71, etc.

The parameter K1 suitable for the resolution level of the reconstructed image is obtained in the following manner. Note that in the following example, a frequency enhancement process employing band-limited image signals (band-pass signals), described in Japanese Unexamined Patent Application No. 2000-17107 filed by the applicant of this application, etc., is performed on an image signal (obtained at a reading density of 10 scan/mm from a radiation image of a human body recorded on an stimulable phosphor sheet, which serves as the reference-resolution) so that the reproduced image is suitable for use in diagnosis.

First, an example of switching mask size N according to the resolution level of a reconstructed image will be described. The peak frequency f0 (cycle/mm), at which enhancement goes peak, is dependent on frequency rank RN. For instance, the peak frequency f0 (cycle/mm) can be defined by Eq. (1) in accordance with the frequency rank RN. The frequency rank RN and the peak frequency f0 are image-processing parameters, but do not depend on image resolution.

$$f0=4.0/2(9-RN) \tag{1}$$

In the example of Eq. (1), the frequency rank RN is between 0 and 9 and rank 9 is defined as 4.0 (cycle/mm). Also, if the frequency rank RN is reduced by 1, the peak frequency f0 is reduced to ½.

On the other hand, the mask size N (the number of horizontal pixels×the number of vertical pixels) used in performing the enhancement process can be calculated with Eq. (2) from the peak frequency f0 and the image resolution SR (scan/mm) of a subject image. Note that it is preferable to correct the value of the mask size N calculated with Eq. (2) to an odd number.

$$N=1.43 \times SR/f0 \tag{2}$$

From the aforementioned Eq. (2), the mask size N with a frequency rank RN of 5 becomes 57 when the reference-resolution SR is 10 scan/mm and becomes 15 when the reference-resolution SR is 2.5 scan/mm. Thus, if the frequency rank RN or peak frequency f0 is employed as the image-processing parameter, the mask size N corresponding to the frequency rank (or peak frequency) can be derived using Eq. (2) in accordance with the image resolution SR.

Next, an example of switching a parameter other than the mask size in accordance with the resolution level of a reconstructed image will be described. Note that the switching method has been proposed in the aforementioned Japanese Unexamined Patent Application No. 2000-17107.

The reference-processing parameter acquisition means 52 provided in the image-processing system 1 inputs reference-transformation functions $f_1$ to $f_N$ (one form of the reference-processing parameter), corresponding to band-limited image signals for the reference-resolution image, to the parameter-setting means 56. Here, when zoom rate M1=1 is input to the reconstruction means 10 and the parameter-setting means 56, the reconstruction means 10 reconstructs the original image signal $S_{org}$ (=S1), which represents the reference-resolution image read out with a reading density of 10 scan/mm (reference-resolution). Based on the reconstructed-image signal S1, the image-processing means 20 generates a plurality of band-limited image signals and blurred-image signals.

Figure 4:
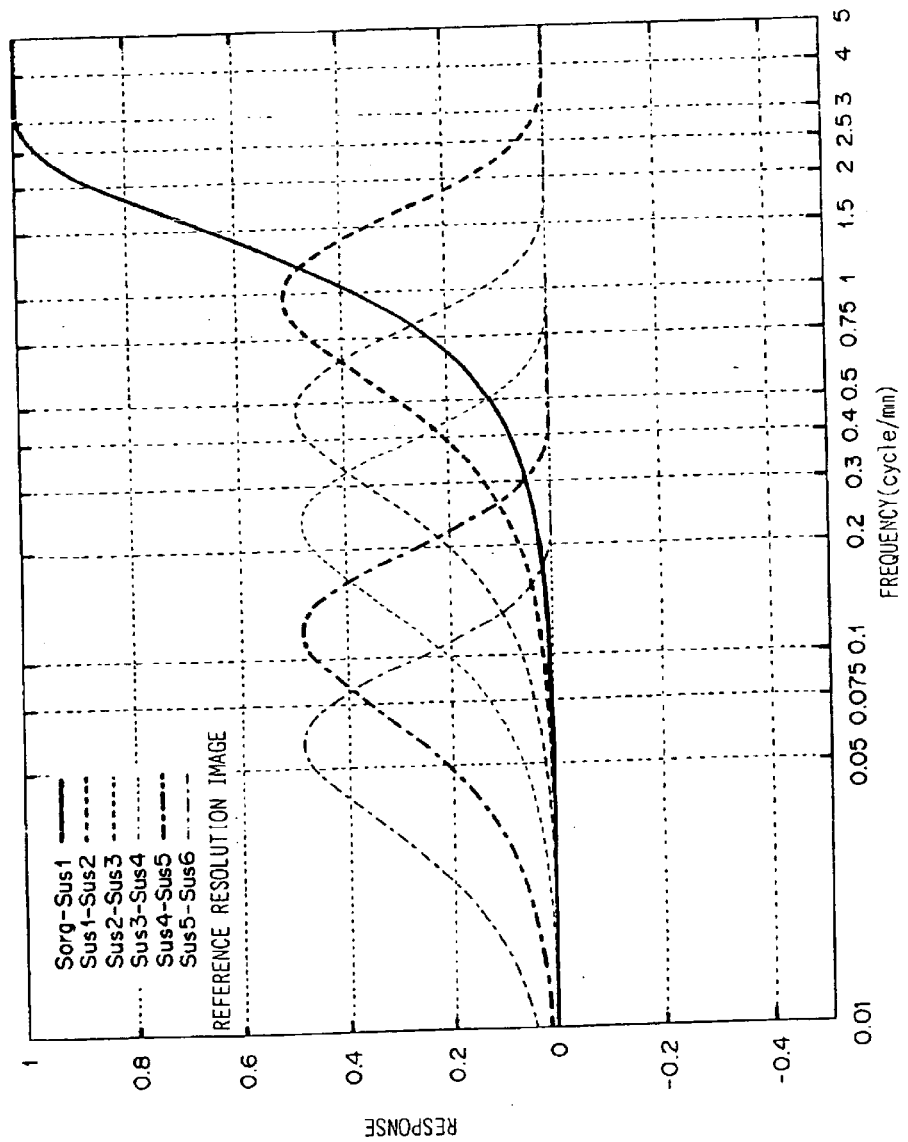
FIG. 4 is a graph showing the frequency-response characteristics of band-limited image signals for a reference-resolution image.
Figure 5:
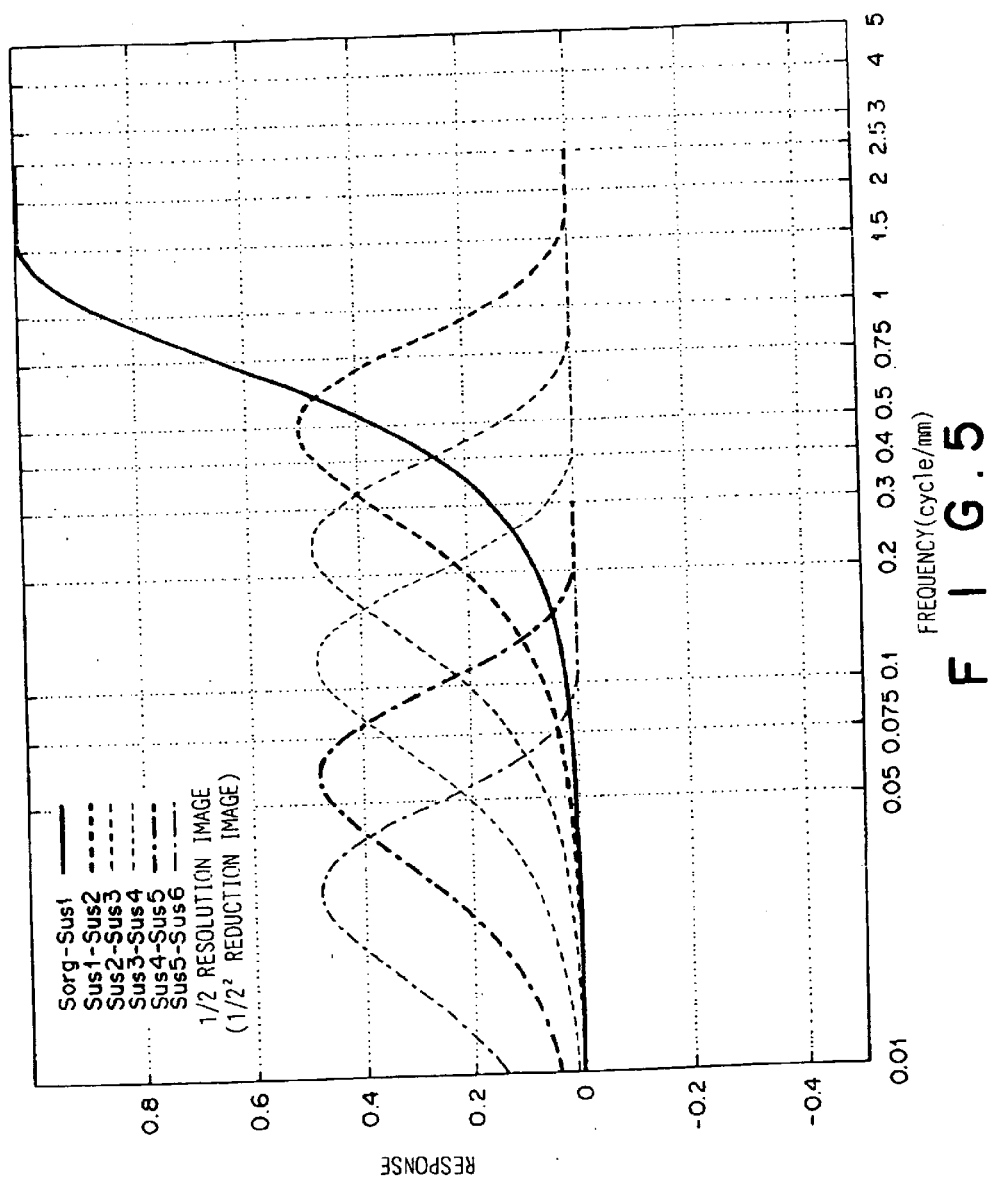
FIG. 5 is a graph showing the frequency-response characteristics of band-limited image signals for a ½-resolution image.

When the reading density is 10 scan/mm, the Nyquist frequency of the original image signal $S_{org}$ is 5 cycle/mm. As shown in FIG. 4, the peak frequency of the band-limited image signal in the maximum frequency band becomes this Nyquist frequency 5 cycle/mm, and the peak frequency of the band-limited image signal in the second maximum frequency band becomes 1.0 cycle/mm, which has a value of one-fifth of the Nyquist frequency. Thereafter, as the frequency band becomes a lower frequency band, the peak frequency becomes one-half the previous peak frequency, like 0.5 cycle/mm, 0.25 cycle/mm, 0.12 cycle/mm, and 0.06 cycle/mm. Also, when an image signal representing an image which has one-half the resolution of the reference-resolution image is assumed as the original image signal $S_{org}$, the peak frequencies of the band-limited image signals become 2.5 cycle/mm, 0.5 cycle/mm, 0.25 cycle/mm, 0.125 cycle/mm, and 0.06 cycle/mm, as shown in FIG. 5.

Figure 6:
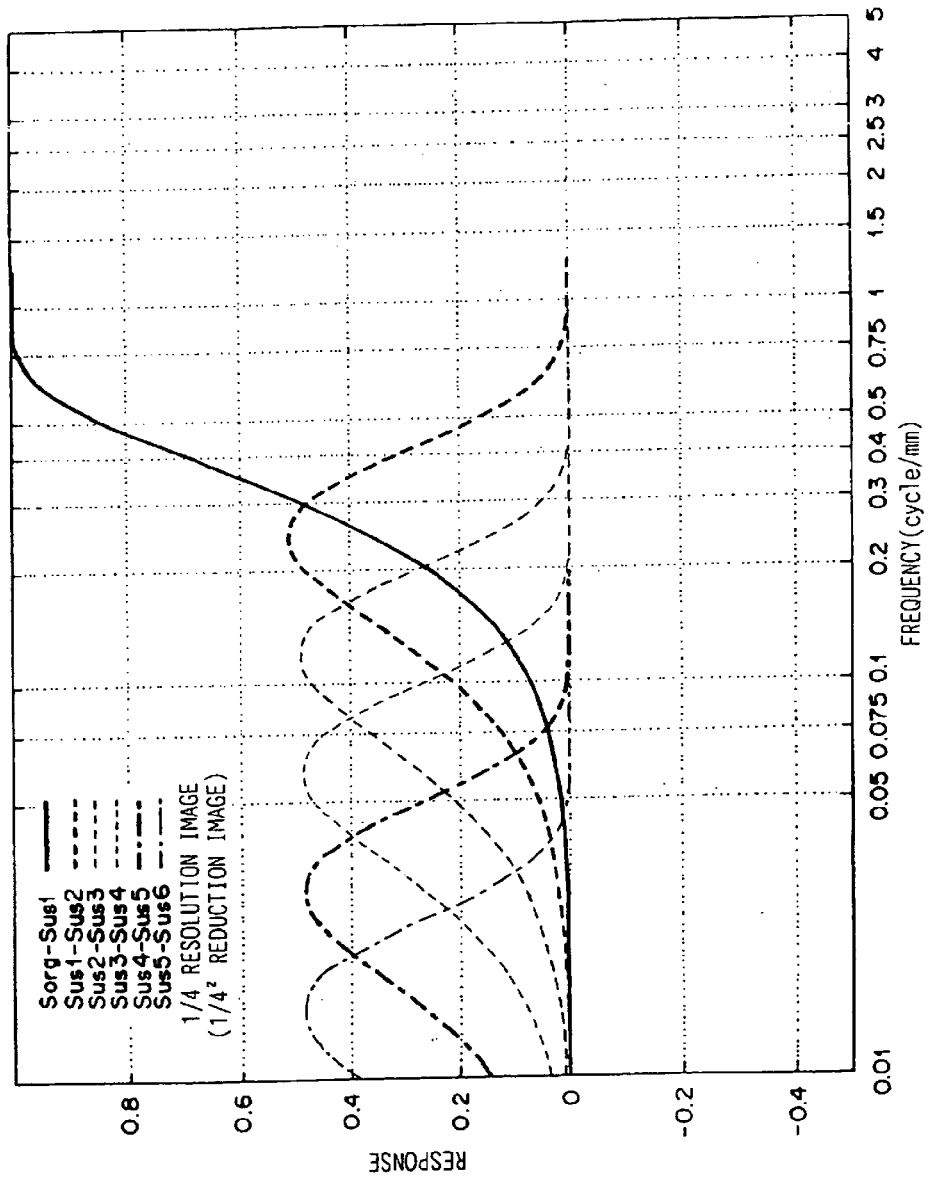
FIG. 6 is a graph showing the frequency-response characteristics of band-limited image signals for a ¼-resolution image.
Figure 7:
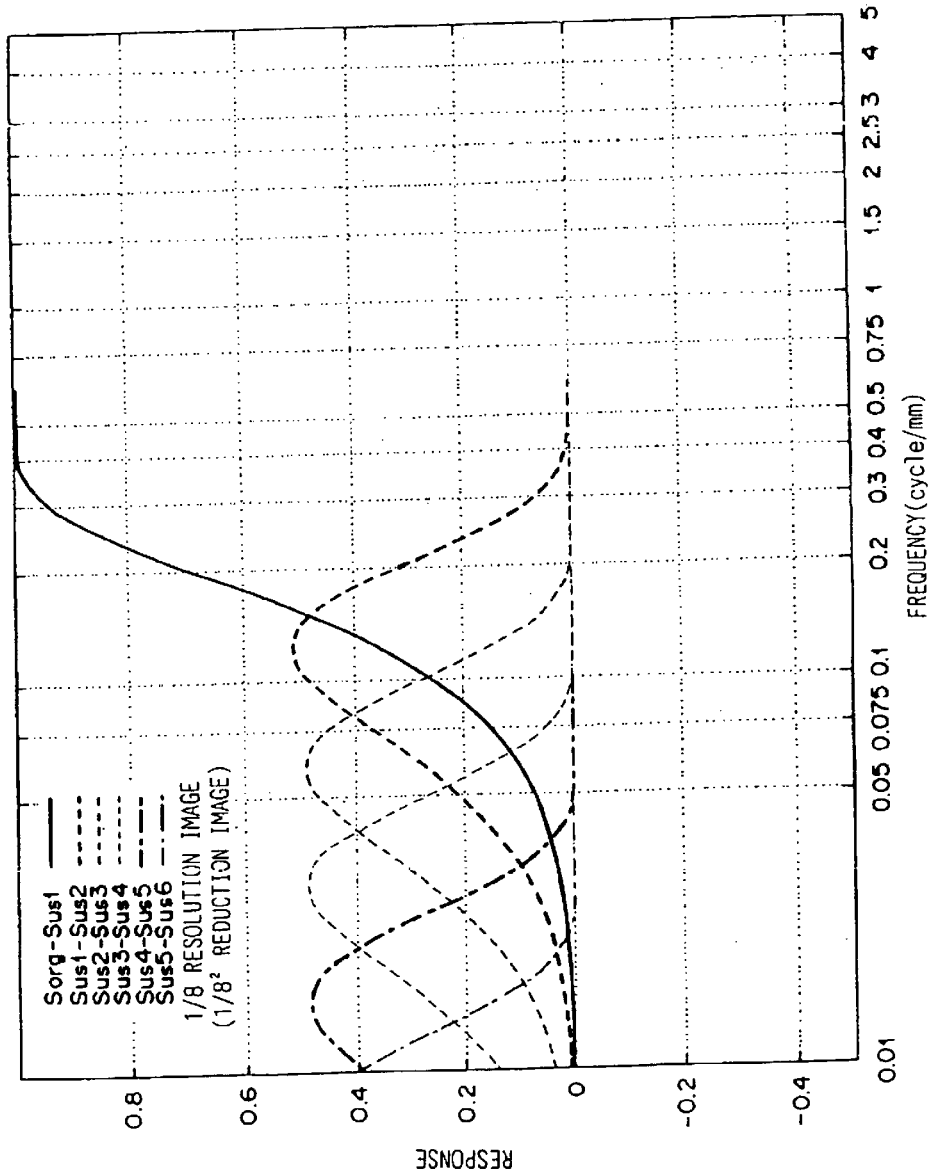
FIG. 7 is a graph showing the frequency-response characteristics of band-limited image signals for a ⅛-resolution image.
Figure 8:
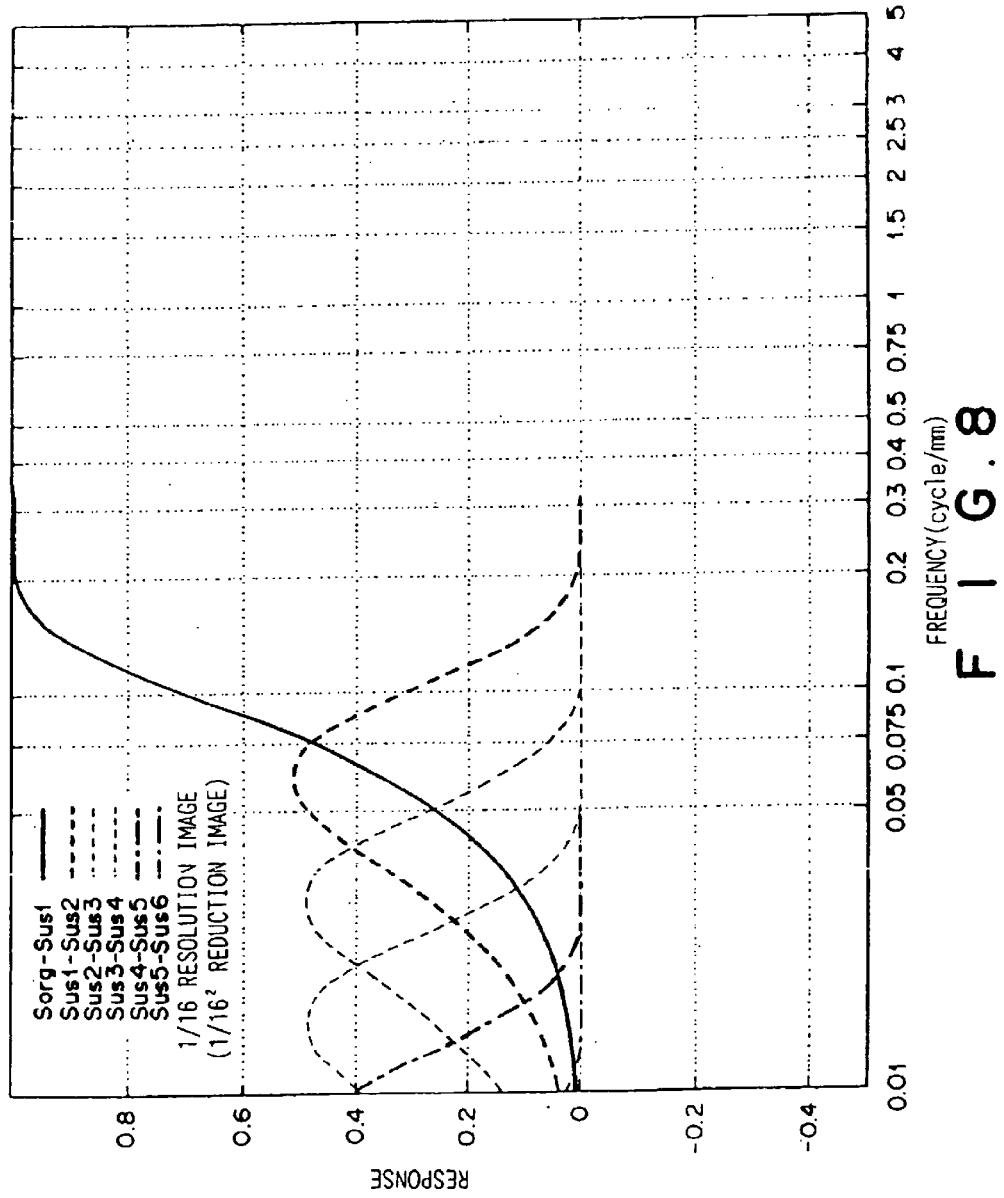
FIG. 8 is a graph showing the frequency-response characteristics of band-limited image signals for a ¹⁄₁₆-resolution image.

When image signals representing images which have resolutions of ¼, ⅛, and ¹⁄₁₆ of the reference-resolution image are assumed as the original image signals $S_{org}$, the peak frequencies of the band-limited image signals are as shown in FIGS. 6 through 8. That is, the peak frequency of the band-limited image signal in the maximum frequency band, among the band-limited image signals, becomes the Nyquist frequency corresponding to the resolution level, and the peak frequency of the band-limited image signal in the next highest frequency band becomes one-fifth the Nyquist frequency. Thereafter, as the frequency band becomes a lower frequency band, the peak frequency becomes one-half the previous peak frequency of the previous frequency band.

On the other hand, when a reduction image having a resolution level lower than the reference-resolution by 1 stage (zoom rate M1=½²) is reconstructed, the corresponding relationship between the blurred-image signals $S_{org}$ to $S_{us5}$, obtained from the image signal representing the reduction image, and the blurred-image signals $S_{org}$ to $S_{us6}$ ($S_{org}$=S1) related to the aforementioned reference-resolution image is shown in FIG. 9 so that the blurred-image signals in the same frequency range are in the same column. Note that in FIG. 9, the corresponding relationship between the original image signal $S_{org}$ and the blurred-image signals $S_{usk}$ is also shown from a ¼ resolution image (¼² reduction image) to a ¹⁄₁₆ resolution image (¹⁄₁₆² reduction image). As shown in FIG. 9, the blurred-image signal $S_{us1}$ of the reference-resolution image corresponds, for example, to the blurred-image signal $S_{org}$ of the ½-resolution image. Similarly, the corresponding relationship moves relatively to the right side of FIG. 9, so that the $S_{us2}$, $S_{us3}$, $S_{us4}$, $S_{us5}$, and $S_{us6}$ of the reference-resolution image correspond to the $S_{us1}$, $S_{us2}$, $S_{us3}$, $S_{us4}$, and $S_{us5}$ of the ½-resolution image, respectively.

In addition, the corresponding relationship between the 6 (six) band-limited image signals ($S_{org}$–$S_{us1}$, $S_{usk}$–$S_{usk+1}$ where k is an integer), obtained of the reference-resolution image signal, and the low-resolution band-limited image signals, obtained of each low-resolution image signal representing an image of each resolution level, is shown in FIG. 10 so that the band-limited image signals in the same frequency range are in the same column. The low-resolution band-limited image signals in the low-frequency band of 0.03 cycle/mm or less, among the low-resolution band-limited signals that are generated when a reduction image is subjected to such image processing, are not used in the process of enhancing the reference-resolution image, because they are signals in a frequency range that is not used in the enhancement process. This is why the low-resolution band-limited image signals in the low-frequency band of 0.03 cycle/mm or less are not shown for ½ to ¹⁄₁₆ resolution images in FIGS. 9 to 11.

On the other hand, the parameter-setting means 56 derives a transformation function $f_k$ corresponding to each low-resolution band-limited image signal. For the band-limited image signals obtained of the reference-resolution image signal, transformation functions $f_1$ to $f_6$ are employed as the reference-processing parameter, as described above. However, for the low-resolution band-limited image signals obtained of the low-resolution image signal representing the ½-resolution image (½² reduction image), the parameter K1 for the ½ resolution image is derived by shifting (moving relatively) the reference-transformation function $f_1$ to $f_6$ so that the peak wavelength of the low-resolution band-limited image signal corresponding to a transformation function to be set becomes the same as the wavelength of each band-limited image signal obtained of the reference-resolution image signal.

The corresponding relationship of the transformation functions of each of the ½ to ¹⁄₁₆ resolution images is shown in FIG. 11. As shown in FIG. 10, the peak wavelength of the band-limited image signal $S_{us1}$–$S_{us2}$ of the reference-resolution image, for instance, becomes the same as that of the low-resolution band-limited image signal $S_{org}$–$S_{us1}$ in the ½ resolution image. This relationship moves relatively to the right side of FIG. 10. Therefore, as shown in FIG. 10, if the resolution of a low-resolution image to be processed becomes $½^k$ of the reference-resolution, the transformation function $f_N$ for the low-resolution image employs k transformation functions, on the lower-frequency band side, from among the reference-transformation functions $f_1$ to $f_6$.

From the above relationship, a low-resolution integration signal $F_{usm1}$ employed when the frequency enhancement process is performed on a ½-resolution image is expressed by Eq. (4), and integration signal $F_{usm0}$ employed when the frequency enhancement process is performed on the reference-resolution image is expressed by Eq. (3).

$$F_{usm0}(S_{org}, S_{us1}, S_{us2}, \ldots, S_{us6}) = f_1(S_{org} - S_{us1}) + \qquad (3)$$
$$f_2(S_{us1} - S_{us2}) + \ldots + f_5(S_{us4} - S_{us5}) + f_6(S_{us5} - S_{us6})$$

$$F_{usm1}(S_{org}, S_{us1}, S_{us2}, \ldots, S_{us5}) = f_2(S_{org} - S_{us1}) + \qquad (4)$$
$$f_3(S_{us1} - S_{us2}) + \ldots + f_4(S_{us3} - S_{us4}) + f_5(S_{us4} - S_{us5})$$

where $f_k$ (i.e., $f_1$ to $f_6$) is a function to transform each band-limited image signal.

The transformation functions $f_1$ to $f_5$ derived in this manner, which are the image-processing parameter K1 suitable for the reconstructed resolution, are set to the image-processing means 20. Then, the low-resolution integration signal $F_{usm1}$ for the image signal S1, which represents the ½ resolution image reconstructed by the reconstruction means 10 is derived based on the aforementioned Eq. (3) by the image-processing means 20, employing the image-processing parameter K1 (i.e., transformation functions $f_1$ to $f_5$). Next, as shown in the following Eq. (5), the low-resolution integration signal $F_{usm1}$ is multiplied by an enhancement coefficient $\beta1(S_{org})$ and added to the original signal $S_{org}$ (in this example, the ½ resolution image signal S1), whereby a processed-image signal $S_{proc}$ (=S2) is generated. This processed-image signal $S_{proc}$ represents an image (½² reduction image) having the ¼ image-size and ½ resolution of the reference-resolution image.

$$S_{proc} = S_{org} + \beta1(S_{org}) \times F_{usm1}(S_{org}, S_{us1}, S_{us2}, \ldots, S_{us5}) \qquad (5)$$

where $\beta1(S_{org})$ is an enhancement coefficient dependent on the ½ resolution image.

For cases in which an image whose high-frequency component has been enhanced by the use of the reference-resolution image is to be reproduced, the low-resolution integration signal $F_{usm1}$ is multiplied by an enhancement coefficient $\beta0(S_{org})$ and again added to the original signal $S_{org}$ (in this example, the reference-resolution image signal), as shown in Eq. (6) to generate the processed-image signal $S_{proc}$.

$$S_{proc} = S_{org} + \beta 0(S_{org}) \times F_{usm1}(S_{org}, S_{us1}, S_{us2}, \ldots, S_{us6}) \quad (6)$$

in which $\beta 0(S_{org})$ is an enhancement coefficient dependent on the reference-resolution image.

Thus, the image-processing parameter K1 suitable for the reconstructed image is derived by correcting the reference-processing parameter K0 employed for the reference-resolution image, and the image characteristics of the reduction image subjected to the frequency enhancement process are caused to be substantially the same as that of the reference-resolution image subjected to the image-processing, regardless of the resolution level of the reconstructed image (reconstructed resolution).

In addition, the necessity for preparing an image-processing parameter for each resolution level is eliminated, because the image-processing parameter K1 for a reconstructed images is derived by correcting (in the preferred embodiment, by moving relatively) the reference-processing parameter K0 for the reference-resolution image. This can make the construction of a system employing the present invention simpler and can also eliminate the cumbersomeness of managing image-processing parameters.

Furthermore, for cases in which the image-size of an output image is to be made smaller than that of the reference-resolution image, an image to be processed becomes a reduction image whose number of pixels is smaller than that of the reference-resolution image, and a predetermined process such as an enhancement process, etc., can be performed on the reduction image, whereby the calculation time for the predetermined process can be shortened.

The preferred embodiment has been described by way of an example case in which a desired output-size is smaller than the image-size of the reference-resolution image. Therefore, there is a relation of $2^k$ (where k is a negative integer) between the reference-resolution and the reconstructed resolution, and an image with the reconstructed resolution becomes a reduction image. However, the present invention is not limited to the relation of $2^k$ (where k is a negative integer) it is also applicable, for example, to a relation of $2^k$ (where k is a positive integer), in which case the reconstructed image becomes an enlargement image.

In addition, the preferred embodiment has been described on the assumption that in the multiple-resolution transformation process of the image signal S0 stored in the file server 62, each resolution level in the aforementioned hierarchy had been decided in advance to be at a relation of $2^k$ (where n is a negative integer) relative to the reference-resolution. However, the present invention is not limited to the relation of $2^k$, but is applicable to an arbitrary relation of zoom rate, such as a zoom rate of ⅓, etc. Furthermore, the invention is applicable to cases in which there is no relation of zoom rate between the reference-resolution and the reconstructed resolution. Even in these cases, parameters suitable for the reconstructed resolution can be derived. When parameters for the reconstructed resolution are calculated in these cases, the present invention is not limited to employing the aforementioned relative-movement (shift) of the reference-transformation functions as the reference-processing parameter. Any method may be employed, so long as a parameter suitable for use at the reconstructed resolution is obtained thereof. Note that for cases in which no relation of zoom rate for each resolution level in the hierarchy has been determined in advance and a multiple-resolution transformation process is to be performed, it is preferable that information on each resolution level relative to the reference-resolution, as well as the reference-resolution information G0 be acquired, and the zoom rates M1 and M2 be calculated.

Now, a description will be given for cases in which there is no relation of $2^k$ times. When reconstruction is performed at a resolution equivalent to 300 dpi, for instance, the reconstruction is performed in the following manner. Note that this method has also been proposed in the aforementioned Japanese Patent Application No. 2000-17107.

Assume that the transformation functions $f_1$ to $f_N$, which are set to the band-limited image signals obtained of the original-image signal representing an image having the reference-resolution read at a reading density of 10 scan/mm, are each a constant and have values as listed in Table 1.

TABLE 1

| | | | | | | |
|---|---|---|---|---|---|---|
| Peak frequency of band-limited image signal (cycle/mm) | 5 | 1.0 | 0.5 | 0.25 | 0.12 | 0.06 |
| Transformation function | 1.00 | 0.90 | 0.80 | 0.60 | 0.40 | 0.20 |

Figure 12:
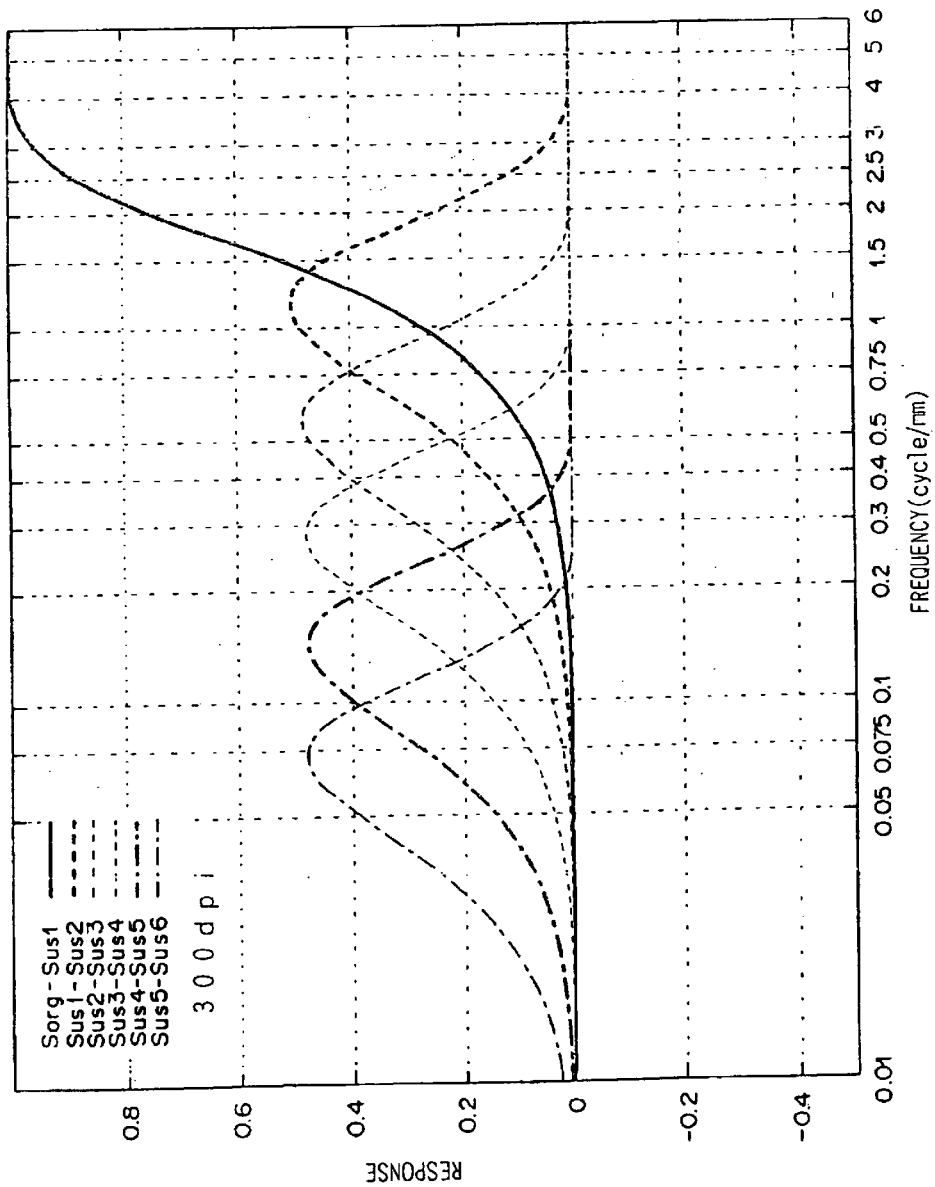
FIG. 12 is a graph showing the frequency-response characteristics of the band-limited image signals obtained of the original image signal having a resolution of 300 dpi.
Figure 13:
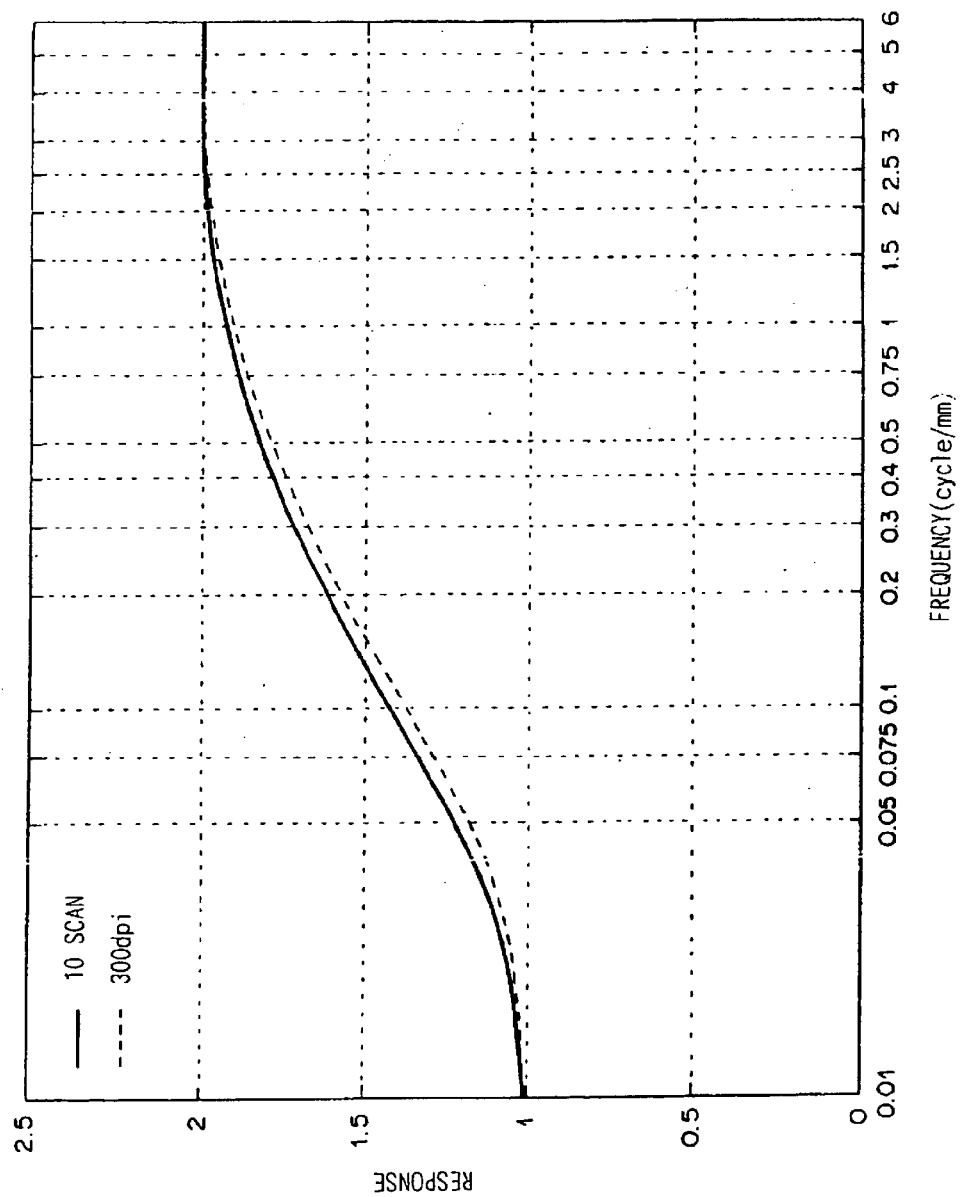
FIG. 13 is a graph showing the frequency-response characteristics of processed-image signals obtained in 300-dpi resolution by use of a reference transformation function.

As mentioned above, to enhance a desired frequency component of the original image signal $S_{org}$, the frequency enhancement process may be performed with the transformation function $f_k$ corresponding to the frequency band of the band-limited image signal. Shown in FIG. 12 are the frequency-response characteristics of the band-limited image signals obtained of the original image signal $S_{org}$ having a resolution of 300 dpi. As shown in the figure, the Nyquist frequency of the original image signal $S_{org}$ having a resolution of 300 dpi is 5.9 cycle/mm. The peak frequency of the band-limited image signal in the maximum frequency band becomes this Nyquist frequency 5 cycle/mm. The peak frequency of the band-limited image signal in the second maximum frequency band becomes 1.18 cycle/mm, which is one-fifth the Nyquist frequency. Thereafter, as the frequency band becomes a lower frequency band, the peak frequency becomes one-half the previous peak frequency, such as 0.59 cycle/mm, 0.30 cycle/mm, 0.15 cycle/mm, 0.07 cycle/mm, and so on. This relation coincides with the frequency-response characteristics of the band-limited image signals in each resolution level shown in FIGS. 2 to 8.

Therefore, if a transformation function for use with a reference-resolution obtained at a reading density of 10 scan/mm, is applied as it is to ane original image signal $S_{org}$ having a resolution of 300 dpi, the processed-image signal $S_{proc}$ obtained of the original image signal $S_{org}$ having the reference-resolution will differ in frequency response characteristics from the processed-image signal $S_{proc}$ obtained of the original image signal $S_{org}$ having a resolution of 300 dpi. Out of this arises the need for calculating a transformation function suitable for the 300-dpi resolution.

Assume that in this example, the transformation function suitable for use with a 300-dpi resolution is calculated by linear interpolation or extrapolation. More specifically, a transformation function fx to be derived can be obtained from Eq. (7) if it is expressed in terms of the peak frequencies Ca and Cb of the band-limited image signals obtained of the original image signal $S_{proc}$ of the reference-resolution image, reference-transformation functions fa and fb corresponding to the peak frequencies Ca and Cb, and the peak frequency C of the band-limited image signal obtained of the original image signal $S_{proc}$ of 300-dpi resolution corresponding to the value of the transformation function fx. For example, a transformation function, which corresponds to a band-limited image signal in which the peak frequency C is 1.18 cycle/mm, can be obtained based on the values of the transformation functions of the peak frequencies 5 cycle/mm and 1 cycle/mm listed in Table 1 by using Eq. (8). If the linear interpolation or extrapolation is performed on all the peak frequencies, and a transformation function corresponding to each band-limited image signal is derived, transformation functions corresponding to a 300-dpi image can be obtained as shown in Table 2.

$$fx=fa+(fa-fb)/(Ca-Cb)\times C \tag{7}$$

$$fx=\tfrac{1}{40}\times C(=1.18)+0.875 \tag{8}$$

TABLE 2

| | | | | | | |
|---|---|---|---|---|---|---|
| Peak frequency of a band-limited image signal (cycle/mm) | 5.9 | 1.18 | 0.59 | 0.30 | 0.15 | 0.07 |
| Transformation function | 1.02 | 0.91 | 0.82 | 0.64 | 0.45 | 0.24 |

Figure 14:
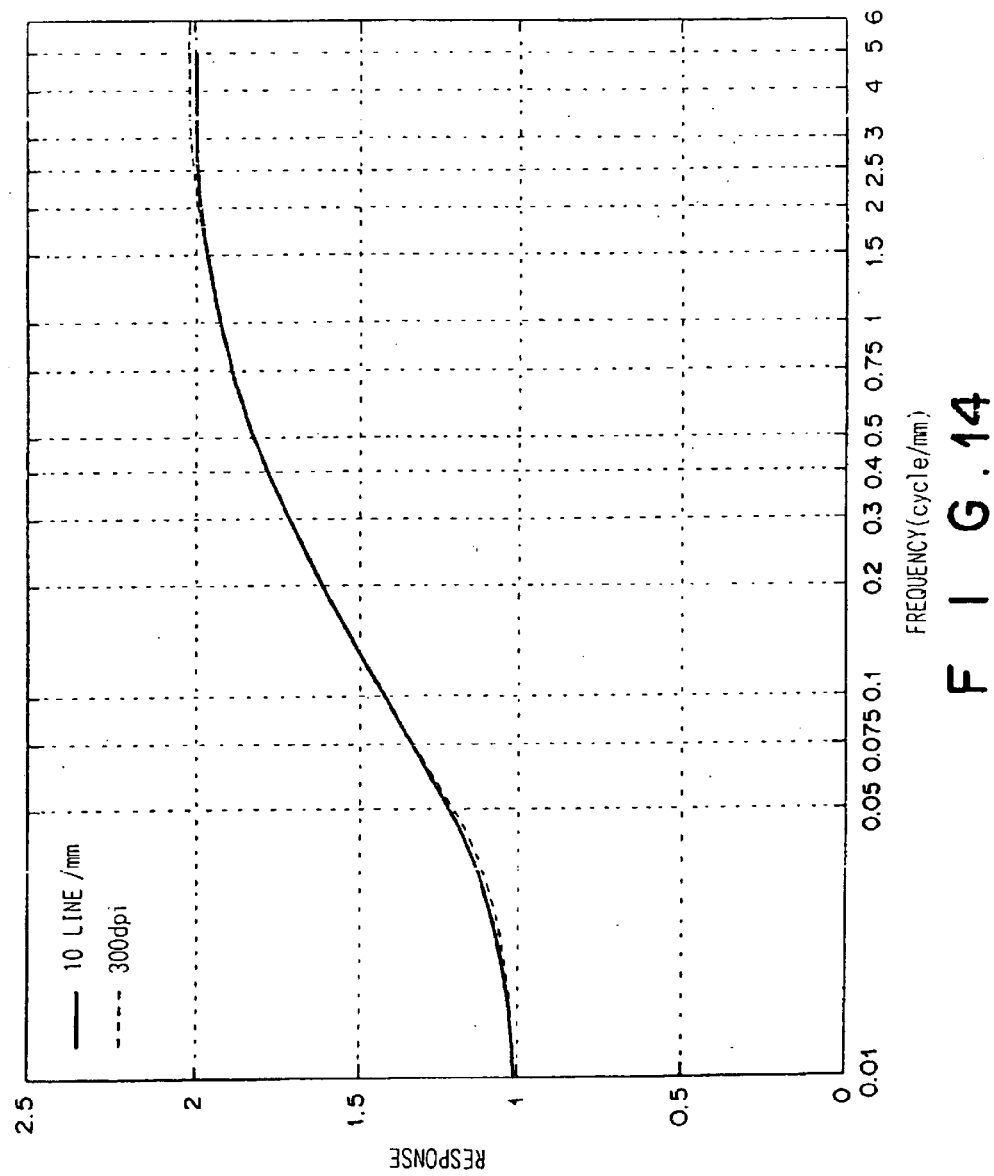
FIG. 14 is a graph showing the frequency-response characteristics of processed-image signals obtained in 300-dpi resolution by use of a reference transformation function for 300-dpi resolution.

In the image-processing means 20, the integration signal $F_{usm1}$ is derived according to the aforementioned Eq. (3) based on the transformation functions obtained in the aforementioned manner, and the frequency-enhancement process is performed according to the aforementioned Eq. (6), whereby the processed-image signal $S_{proc}$ is obtained. Here, FIG. 14 shows the relationship of the frequency-response characteristics of the processed-image signal $S_{proc}$, subjected to processing employing the transformation function for use with a 300-dpi resolution, and the processed-image signal $S_{proc}$ obtained of the reference-resolution image. As shown in FIG. 14, the processed-image signals $S_{proc}$ are found to have substantially the same frequency-response characteristics, regardless of the resolution (reconstructed resolution) of the original image signal subjected to the processing.

While, in the above example, the transformation function for use with a 300-dpi resolution has been derived by the use of linear interpolation, the present invention is not limited to this. Although the transformation function in the above example is a constant, it may be a nonlinear function with a predetermined gradient, as proposed in the aforementioned Japanese Unexamined Patent Application No. 2000-17107.

Thus, according to the present invention, when an image having an image-size differing from the reference-resolution image to be reproduced, the resolution level of a reconstructed image (equivalent to the reconstructed image-size), which becomes an object of processing, is prescribed based on both the size of a reproduced image (output-size) and the size of the reference-resolution image. In addition, an image-processing parameter suitable for the resolution level of a reconstructed image is derived by correcting the reference-processing parameter of the reference-resolution image, and the reconstructed image is subjected to image-processing by the use of the thus derived image-processing parameter. Thereby, the image characteristics of the reconstructed image subjected to the image-processing are caused to be substantially the same as that of the reference-resolution image subjected to the image-processing, regardless of the resolution level of the reconstructed image.

Because the image-processing parameter for the reconstructed image is calculated by correcting the reference-processing parameter for the reference-resolution image, the necessity of preparing an image-processing parameter of each resolution level of the reconstructed image is eliminated. This can make the construction of a system employing the present invention simpler as well as eliminate cumbersomeness involved in managing image-processing parameters.

If the size of an image to be finally reproduced (output-size) is set, the first zoom rate M1, which prescribes the resolution level of a reconstructed image and the second zoom rate M2 corresponding to the reconstructed image subjected to image-processing, are automatically derived, whereby, the present invention is made easy to handle.

For cases in which an image smaller in image-size than the reference-resolution image is to be reproduced if the resolution level of a reconstructed image is ½ or less of the reference resolution, the reconstructed image becomes a reduction image smaller in number of pixels than the reference-resolution image, and the calculation time required for image-processing to be performed on such reduction images is, as a result, reduced.

While the present invention has been described with reference to the preferred embodiment thereof, the invention is not to be limited to the details given herein, but may be modified within the scope of the invention hereinafter claimed.

For example, although the zoom-rate calculation means 54 derives the second zoom rate M2, which makes the final size of a reproduced image coincident with the set output-size, it may derive a zoom rate that causes the reproduced image to be of a desired size, without regard to the set output-size.

While the multiple-resolution transformation process in the aforementioned embodiment utilizes the wavelet-transformation process, the multiple-resolution transformation process is not limited to employment of the wavelet-transformation process, but may utilize a Laplacian pyramid transformation, a Gaussian pyramid transformation, etc.

Although, in the aforementioned embodiment, the parameters of an enhancement filter, a smoothing filer, and of a transformation function employed in a frequency enhancement process have been used as examples of the image-processing parameter, the present invention is not limited to these parameters. For instance, the image-processing parameter may be a parameter used in calculating the pixel vector of an image, a parameter employed in image-processing which employs an iris filter, etc.

What is claimed is:

1. An image-processing method comprising the steps of:
    reconstructing an image which has a resolution differing from a reference-resolution, based on an image signal subjected to a multiple-resolution transformation process; and
    calculating an image-processing parameter, based on a reference-processing parameter employed in performing a predetermined image-processing process on a reference-resolution image having said reference resolution, said image-processing parameter being employed in performing said predetermined image-processing process on the reconstructed image and causing the image characteristics of said reconstructed image subjected to said predetermined image processing process to be substantially the same as the image characteristics of said reference-resolution image subjected to said predetermined image-processing process.

2. The image-processing method as set forth in claim 1, wherein said image signal is subjected to said multiple-resolution transformation process so that the resolution of each image is $2^k$ (where k is an integer) times that of said reference-resolution, and the image-size of each image is $2^{2k}$ times the image-size of said reference-resolution image; and
    said reconstructed image is an image having a resolution which does not fall within the $2^k$ times range of said reference-resolution.

3. The image-processing method as set forth in claim 2, wherein said reconstructed image subjected to said predetermined image-processing process is further converted to an image having a desired image-size.

4. The image-processing method as set forth in claim 2, wherein said reconstructing is performed so that the image-size of said reconstructed image is $2^{2k}$ times the image-size of said reference-resolution image, close to the image-size of an image which is to be reproduced and output as a visible image; and an image subjected to said predetermined image-processing process is further subjected to a zoom process so that it becomes equal in size to the image-size of said output image.

5. The image-processing method as set forth in claim 4, wherein said reference-processing parameter is stored in correlation with said image signal.

6. The image-processing method as set forth in claim 4, wherein said image-processing parameter is calculated based on the characteristic of said multiple-resolution transformation process.

7. The image-processing method as set forth in claim 2, wherein said reference-processing parameter is stored in correlation with said image signal.

8. The image-processing method as set forth in claim 2, wherein said image-processing parameter is calculated based on the characteristic of said multiple-resolution transformation process.

9. The image-processing method as set forth in claim 1, wherein said reconstructed image subjected to said predetermined image-processing process is further converted to an image having a desired image-size.

10. The image-processing method as set forth in claim 9, wherein said reference-processing parameter is stored in correlation with said image signal.

11. The image-processing method as set forth in claim 9, wherein said image-processing parameter is calculated based on the characteristic of said multiple-resolution transformation process.

12. The image-processing method as set forth in claim 1, wherein said reference-processing parameter is stored in correlation with said image signal.

13. The image-processing method as set forth in claim 12, wherein said image-processing parameter is calculated based on the characteristic of said multiple-resolution transformation process.

14. The image-processing method as set forth in claim 1, wherein said image-processing parameter is calculated based on the characteristic of said multiple-resolution transformation process.

15. The method of claim 1, wherein the image signal is based on a digital image.

16. The method of claim 1, wherein the multiple-resolution process comprises one of a wavelet-transformation, Laplacian pyramid-transformation and a Gaussian pyramid transformation.

17. The method of claim 1, wherein the calculation of an image-processing parameter comprises spatial calculations to determine at least one of mask sizes and filter coefficients for the predetermined image-processing process.

18. The method of claim 17, wherein the image-processing parameter is based on at least one of a zoom information of the reference-resolution image and the reference resolution.

19. The method of claim 17, wherein the predetermined image-processing process comprises a spatial filter for performing at least one of a high-frequency enhancement process and a smoothing process.

20. An image-processing system comprising:

reconstruction means for reconstructing an image which has a resolution differing from the reference-resolution, based on an image signal subjected to a multiple-resolution transformation process;

image-processing means for performing a predetermined image-processing process on the reconstructed image; and parameter-setting means for deriving an image-processing parameter, based on a reference-processing parameter employed in performing a predetermined image-processing process on a reference-resolution image having said reference-resolution, and setting the derived image-processing parameter to said image-processing means, said image-processing parameter being employed in performing said predetermined image-processing process on said reconstructed image and causing the image characteristics of said reconstructed image subjected to said predetermined image-processing process to be substantially the same as the image characteristics of said reference-resolution image subjected to said predetermined image-processing process, approximately the same.

21. The image-processing system as set forth in claim 20, wherein said image signal is subjected to said multiple-resolution transformation process so that the resolution of each image is $2^k$ (where k is an integer) times that of said reference-resolution and an image-size of each image is $2^{2k}$ times that of the image-size of said reference-resolution image; and said reconstruction means obtains said reconstructed image having a resolution not falling within the $2^k$ times range of said reference-resolution.

22. The image-processing system as set forth in claim 21, further comprising zoom-processing means for further converting said reconstructed image subjected to said predetermined image-processing process, to an image having a desired image-size.

23. The image-processing system as set forth in claim 21, wherein said reconstruction means reconstructs an image so that the image-size of said image is $2^{2k}$ times the image-size said reference-resolution image, close to the image-size of an image which is reproduced and output as a visible image; and zoom-processing means is further provided for performing a zoom process on an image subjected to said predetermined image-processing, so that it becomes equal in size to the image-size of said output image.

24. The image-processing system as set forth in claim 23, wherein said parameter-setting means derives said image-processing parameter, based on the characteristic of said multiple-resolution transformation process.

25. The image-processing system as set forth in claim 21, wherein said parameter-setting means derives said image-processing parameter, based on the characteristic of said multiple-resolution transformation process.

26. The image-processing system as set forth in claim 20, further comprising zoom-processing means for further converting said reconstructed image subjected to said predetermined image-processing process, to an image having a desired image-size.

27. The image-processing system as set forth in claim 26, wherein said parameter-setting means derives said image-processing parameter, based on the characteristic of said multiple-resolution transformation process.

28. The image-processing system as set forth in claim 20, wherein said parameter-setting means derives said image-processing parameter, based on the characteristic of said multiple-resolution transformation process.

29. The system of claim 20, wherein the image signal is based on a digital image.

30. The system of claim 20, wherein the multiple-resolution process comprises one of a wavelet-transformation, Laplacian pyramid-transformation and a Gaussian pyramid transformation.

31. The system of claim 20, wherein the derivation of the image-processing parameter comprises spatial calculations to determine at least one of mask sizes and filter coefficients for the predetermined image-processing process.

32. The system of claim 31, wherein the image-processing parameter is based on at least one of a zoom information of the reference-resolution image and the reference resolution.

33. The system of claim 31, wherein the predetermined image-processing process comprises a spatial filter for performing at least one of a high-frequency enhancement process and a smoothing process.

34. A computer readable storage medium recording a program to be executed by a computer, said program comprising:
- a procedure for reconstructing an image having a resolution differing from the reference-resolution, based on an image signal subjected to a multiple-resolution transformation process;
- a procedure for calculating an image-processing parameter, based on a reference-processing parameter employed in performing a predetermined image-processing process on a reference-resolution image having said reference-resolution, said image-processing parameter being employed in performing said predetermined image-processing on said reconstructed image and causing the image characteristics of said reconstructed image subjected to said predetermined image-processing to be substantially the same as the image characteristics of said reference-resolution image subjected to said predetermined image-processing; and
- a procedure for performing said predetermined image-processing process on said reconstructed image by use of said image-processing parameter.

35. The storage medium as set forth in claim 34, wherein said image signal is subjected to said multiple-resolution transformation process so that the resolution of each image is $2^k$ (where k is an integer) times that of said reference-resolution, and the image-size of each image is $2^{2k}$ times that of the image-size of said reference-resolution image; and
said reconstructing procedure is a procedure for obtaining said reconstructed image having a resolution not falling within the $2^k$ times range of said reference-resolution.

36. The storage medium as set forth in claim 35 further comprising a procedure of further converting said reconstructed image subjected to said predetermined image-processing, to an image having a desired image-size.

37. The storage medium as set forth in claim 35, wherein said parameter calculating procedure is a procedure of calculating said image-processing parameter, based on the characteristic of said multiple-resolution transformation process.

38. The storage medium as set forth in claim 34 further comprising a procedure of further converting said reconstructed image subjected to said predetermined image-processing process, to an image having a desired image-size.

39. The storage medium as set forth in claim 38, wherein said parameter calculating procedure is a procedure of calculating said image-processing parameter, based on the characteristic of said multiple-resolution transformation process.

40. The storage medium as set forth in claim 34, wherein said reconstructing means is a procedure of reconstructing an image so that the image-size of said image is $2^{2k}$ times the image-size of said reference-resolution image, close to the image-size of an image to be reproduced and output as a visible image; and
a zooming procedure is further provided for performing a zoom process on an image subjected to said predetermined image-processing, so that it becomes equal in size to the image-size of said output image.

41. The storage medium as set forth in claim 40, wherein said parameter calculating procedure is a procedure of calculating said image-processing parameter, based on the characteristic of said multiple-resolution transformation process.

42. The storage medium as set forth in claim 34, wherein said parameter calculating procedure is a procedure of calculating said image-processing parameter, based on the characteristic of said multiple-resolution transformation process.

43. The storage medium as set forth in claim 34, wherein the image signal is based on a digital image.

44. The storage medium as set forth in claim 34, wherein the multiple-resolution process comprises one of a wavelet-transformation, Laplacian pyramid-transformation and a Gaussian pyramid transformation.

45. The storage medium as set forth in claim 34, wherein the calculation of the image-processing parameter comprises spatial calculations to determine at least one of mask sizes and filter coefficients for the predetermined image-processing process.

46. The storage medium as set forth in claim 45, wherein the image-processing parameter is based on at least one of a zoom information of the reference-resolution image and the reference resolution.

47. The storage medium as set forth in claim 45, wherein the predetermined image-processing process comprises a spatial filter for performing at least one of a high-frequency enhancement process and a smoothing process.

* * * * *